United States Patent
Liu et al.

(10) Patent No.: US 12,156,235 B2
(45) Date of Patent: *Nov. 26, 2024

(54) COMMUNICATION METHOD, NETWORK SIDE DEVICE, AND TERMINAL

(71) Applicant: HUAWEI TECHNOLOGIES CO., LTD., Guangdong (CN)

(72) Inventors: Deping Liu, Shenzhen (CN); Zhenshan Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,190

(22) Filed: Sep. 18, 2023

(65) Prior Publication Data

US 2024/0080852 A1    Mar. 7, 2024

Related U.S. Application Data

(63) Continuation of application No. 17/108,721, filed on Dec. 1, 2020, now Pat. No. 11,792,809, which is a
(Continued)

(30) Foreign Application Priority Data

Jan. 27, 2016    (WO) ................ PCT/CN2016/072409

(51) Int. Cl.
*H04W 4/00*     (2018.01)
*H04L 1/00*     (2006.01)
(Continued)

(52) U.S. Cl.
CPC .............. *H04W 72/23* (2023.01); *H04L 1/00* (2013.01); *H04L 1/0025* (2013.01);
(Continued)

(58) Field of Classification Search
CPC ..... H04W 72/23; H04W 72/52; H04W 92/18; H04L 1/0025; H04L 1/00
See application file for complete search history.

(56) References Cited

U.S. PATENT DOCUMENTS 9,847,849 B2 * 12/2017 Greenberg ............ H04L 1/0003
2009/0323842 A1  12/2009 Zhang et al.
(Continued)

FOREIGN PATENT DOCUMENTS

| CN | 102056306 | 5/2011 |
| CN | 102271389 | 12/2011 |

(Continued)

OTHER PUBLICATIONS

3GPP TS 36.213 V13.0.1 (Jan. 2016), 3rd Generation Partnership Project; Technical Specification Group Radio Access Network; Evolved Universal Terrestrial Radio Access (E-UTRA); Physical layer procedures (Release 13), total 326 pages.

(Continued)

*Primary Examiner* — Abdelnabi O Musa
(74) *Attorney, Agent, or Firm* — Fish & Richardson P.C.

(57) ABSTRACT

A communication method, a network side device, and a terminal are provided. In the method, a network side device selects one group of values from at least two preset groups of values for a transmission parameter set. The network side device sends the selected group of values. A terminal sends communication data based on the group of values of the at least two groups of values of the transmission parameter set.

35 Claims, 11 Drawing Sheets

Related U.S. Application Data continuation of application No. 16/044,251, filed on Jul. 24, 2018, now Pat. No. 10,873,933, which is a continuation of application No. PCT/CN2016/073365, filed on Feb. 3, 2016.

(51) Int. Cl.
  *H04W 72/23* (2023.01)
  *H04W 72/52* (2023.01)
  *H04W 92/18* (2009.01)

(52) U.S. Cl.
  CPC ..... *H04W 72/52* (2023.01); *H04L 2001/0092* (2013.01); *H04W 92/18* (2013.01)

(56) References Cited

U.S. PATENT DOCUMENTS

| | | | | |
|---|---|---|---|---|
| 2010/0311452 | A1* | 12/2010 | Li | H04W 72/54 455/509 |
| 2011/0194419 | A1 | 8/2011 | Lee et al. | |
| 2013/0089042 | A1 | 4/2013 | Negus et al. | |
| 2014/0126490 | A1* | 5/2014 | Chen | H04L 5/0035 370/328 |
| 2014/0241285 | A1* | 8/2014 | Pang | H04W 74/0833 370/329 |
| 2014/0307643 | A1* | 10/2014 | Froberg | H04L 5/0053 370/329 |
| 2016/0233986 | A1* | 8/2016 | Lee | H04W 72/1273 |
| 2016/0295565 | A1 | 10/2016 | Kim et al. | |
| 2017/0041902 | A1* | 2/2017 | Sheng | H04W 72/02 |
| 2017/0048807 | A1* | 2/2017 | Wang | H04W 52/367 |
| 2017/0188391 | A1* | 6/2017 | Rajagopal | H04W 74/0816 |
| 2017/0208587 | A1* | 7/2017 | Chae | H04W 76/14 |
| 2018/0213379 | A1 | 7/2018 | Xiong et al. | |
| 2018/0242190 | A1* | 8/2018 | Khoryaev | H04W 28/0284 |

FOREIGN PATENT DOCUMENTS

| | | |
|---|---|---|
| CN | 102790948 | 11/2012 |
| CN | 102907161 | 1/2013 |
| CN | 103856263 | 6/2014 |
| CN | 104067551 | 9/2014 |
| CN | 104703224 | 6/2015 |
| CN | 105580288 | 5/2016 |
| EP | 3843491 | 6/2021 |
| JP | 2002320262 | 10/2002 |
| JP | 2006211017 | 8/2006 |
| JP | 2010219748 | 9/2010 |
| JP | 2011166806 | 8/2011 |
| WO | 2015021185 | 2/2015 |
| WO | 2015046913 | 4/2015 |
| WO | 2015069051 | 5/2015 |
| WO | 2015168841 | 11/2015 |
| WO | 20150182949 | 12/2015 |
| WO | 20150200607 | 12/2015 |

OTHER PUBLICATIONS

3GPP TS 36.214 V13.0.0 (Dec. 2015), 3rd Generation Partnership Project; Technical Specification Group Radio Access Network; Evolved Universal Terrestrial Radio Access (E-UTRA); Physical layer; Measurements (Release 13), total 18 pages.

3GPP TS 36.304 V13.0.0 (Dec. 2015), 3rd Generation Partnership Project; Technical Specification Group Radio Access Network; Evolved Universal Terrestrial Radio Access (E-UTRA); User Equipment (UE) procedures in idle mode (Release 13), total 42 pages.

3GPP TS 36.321 V13.0.0 (Dec. 2015), 3rd Generation Partnership Project; Technical Specification Group Radio Access Network; Evolved Universal Terrestrial Radio Access (E-UTRA); Medium Access Control (MAC) protocol specification (Release 13), total 82 pages.

3GPP TS 36.331 V13.0.0 (Dec. 2015), 3rd Generation Partnership Project; Technical Specification Group Radio Access Network; Evolved Universal Terrestrial Radio Access (E-UTRA); Radio Resource Control (RRC); Protocol specification (Release 13), total 507 pages.

5G Infrastructure Public Private Partnership, "5G Automotive Vision," White Paper on Automotive Vertical Sector, Nov. 30, 2015, 67 pages.

Ericsson, "Re-usable Configurations in RRC Signaling",3GPP TSG RAN WG2 #88 R2-144891, San Francisco, US, Nov. 17-21, 2014, total 3 pages.

Extended European Search Report issued in European Application No. 21215188.0 on Jun. 10, 2022, 13 pages.

InterDigital Communications, "Priorities and Pre-emption," 3GPP TSG-RAN WG2 #91, R2-153739, Beijing, China, Aug. 24-28, 2015, 4 pages.

LG Electronics, "Discussion on transmission parameter control and multi-carrier issues for PC5-based V2V," 3GPP TSG RAN WG1 Meeting #82bis, R1-156095, Malmo, Sweden, Oct. 5-9, 2015, 6 pages.

LG Electronics, "Discussion on the operation scenario of PC5-based V2V," 3GPP TSG RAN WG1 Meeting #83, R1-156896, Anaheim, USA, Nov. 15-22, 2015, total 5 pages.

Office Action in Chinese Application No. 202011240850.0, dated Jun. 22, 2021, 4 pages.

Office Action in Chinese Appln. No. 201680079382.9, dated Mar. 18, 2023, 13 pages.

\* cited by examiner

COMMUNICATION METHOD, NETWORK SIDE DEVICE, AND TERMINAL

CROSS-REFERENCE TO RELATED APPLICATIONS

This application is a continuation of U.S. patent application Ser. No. 17/108,721, filed on Dec. 1, 2020, which is a continuation of U.S. patent application Ser. No. 16/044,251, filed on Jul. 24, 2018, now U.S. Pat. No. 10,873,933, which is a continuation of International Application No. PCT/CN2016/073365, filed on Feb. 3, 2016, which claims priority to International Application No. PCT/CN2016/072409, filed on Jan. 27, 2016. All of the aforementioned patent applications are hereby incorporated by reference in their entireties.

TECHNICAL FIELD

The present invention relates to the field of communications technologies, and in particular, to a communication method, a network side device, and a terminal.

BACKGROUND

With development of communications technologies, various types of device-to-device communication, for example, Device to Device (D2D) communication, vehicle-to-vehicle (V2V) communication, vehicle-to-infrastructure (V2I) communication, and vehicle-to-pedestrian communication, are widely applied.

In a device-to-device communications system, terminals can directly perform communication without using a network side device. The network side device may perform resource configuration, scheduling, and coordination, and the like, to assist direct communication between the terminals. Generally, the network side device allocates a transmission resource pool to device-to-device communications terminals, to transmit device-to-device communication data. The resource pool may be understood as a set of a group of time-frequency resources, and includes a resource pool used for transmission and a resource pool used for receiving. The network side device configures, in a broadcast mode, different resource pools, for example, a scheduling assignment (SA) resource pool and a data (data) resource pool, and each resource pool has a fixed period. The device-to-device communications terminal may use, in two modes, a time-frequency resource in the resource pool allocated by the network side device. In one mode, the device-to-device communications terminal uses a determined time-frequency resource that is allocated by the network side device to each device-to-device communications terminal from the resource pool. In the other mode, the device-to-device communications terminal autonomously and randomly selects a time-frequency resource from the resource pool. The resource pool is configured or preconfigured on a network side. The device-to-device communications terminal selects a time-frequency resource from the resource pool in one of the foregoing two modes, and then, transmits device-to-device communication data based on the fixed period of the resource pool.

In terminal-to-terminal communication, especially in an Internet of Vehicles communications system, data packets are periodically transmitted, and each data packet is retransmitted a plurality of times, to improve transmission reliability and expand coverage. In a current mechanism for adjusting a transmission parameter, due to limited adjustable transmission parameters, finer adjustment cannot be performed on such a type of service. Consequently, a phenomenon of poor transmission performance occurs.

SUMMARY

Embodiments of the present invention provide a communication method, a network side device, and a terminal, to provide a more efficient data transmission method, thereby improving transmission performance.

According to a first aspect, a communication method is provided, where a network side device configures a value for each transmission parameter in a transmission parameter set; at least one transmission parameter in the transmission parameter set has at least two preset values; different values of one or more transmission parameters form at least two groups of values of the transmission parameter set; each group of values of the at least two groups of values includes a value of each transmission parameter in the transmission parameter set; at least one transmission parameter in the transmission parameter set has at least two values; one transmission parameter set may have different values at different points in time; the network side device selects a group of values from the at least two groups of values, as a value of the transmission parameter set, and sends the group of values; and a terminal receives the group of values that is of the transmission parameter set and that is sent by the network side device, and sends communication data based on the received group of values of the transmission parameter set. The method can adapt to different system statuses and service requirements, thereby improving transmission performance.

In an embodiment of the present invention, the transmission parameter included in the foregoing transmission parameter set may include one or more of the following transmission parameters: transmit power, a transmit power offset, a sending probability weight, a sending period, a quantity of retransmissions, a modulation and coding scheme (MCS) level, and a resource pool configuration parameter; and the resource pool configuration parameter includes a resource pool period, a resource pool offset, time-frequency resource information, and the like. One or more transmission parameters form the transmission parameter set. The transmission parameter includes, but is not limited to, the foregoing transmission parameters.

In one embodiment, before selecting the value for the transmission parameter set, the network side device obtains sidelink congestion information, to select the value based on the sidelink congestion information, thereby alleviating congestion.

In another embodiment, the network side device may select the group of values based on a transmission requirement set, where at least one transmission requirement in the transmission requirement set has at least two levels, and different transmission requirement levels correspond to different groups of values; and the network side device sends the transmission requirement set and a value of a transmission parameter corresponding to the transmission requirement set, so that differentiated transmission specific to different transmission requirements can be implemented.

The transmission requirement set may include one or more of a data packet length, a transmission delay, a transmission rate, a packet loss rate, a priority, and a quality of service class identifier (QCI). One or more of the foregoing transmission requirements form the transmission requirement set, and different values of the one or more transmission requirements form groups of transmission requirement levels.

According to a second aspect, a communication method is provided, where a terminal obtains a group of values from at least two groups of values that are preset for a transmission parameter set; and the terminal sends communication data based on the group of values of the transmission parameter set. One transmission parameter set may have different values at different points in time. Therefore, the method can adapt to different system statuses and service requirements, thereby improving transmission performance.

The terminal may obtain the group of values of the transmission parameter set from a network side device, or the terminal may select the group of values from the at least two groups of values that are preset for the transmission parameter set. The terminal may be understood as a terminal serving as a transmit end. Each group of values of the at least two groups of values includes a value of each transmission parameter in the transmission parameter set. The transmission parameter included in the transmission parameter set includes at least one of transmit power, a transmit power offset, a sending probability weight, a sending period, a quantity of retransmissions, an MCS level, and a resource pool configuration parameter; and the resource pool configuration parameter includes a resource pool period, a resource pool offset, and time-frequency resource information. At least one transmission parameter in the transmission parameter set has at least two values.

In one embodiment, the group of values of the transmission parameter set may be one group of values that is selected from the at least two preset groups of values based on sidelink congestion information.

The terminal may measure a status of a sidelink, for example, an interference level, an energy level, a reference signal received power (RSRP) value, or resource usage; and determine, based on a measurement result, whether the sidelink is congested. For example, the terminal determines whether the resource usage of the sidelink exceeds a threshold, for example, whether the resource usage exceeds 50% or 80%; and if the threshold is exceeded, it is considered that the sidelink is congested; otherwise, the sidelink is not congested. If the sidelink is congested, and the group of values of the transmission parameter set is one group of values that is selected by the terminal from the at least two preconfigured groups of values, the terminal may select the group of values from the at least two preconfigured groups of values based on the sidelink congestion information.

If the sidelink is congested, and the group of values of the transmission parameter set is obtained from the network side device, before the terminal receives the group of values that is of the transmission parameter set and that is sent by the network side device, the terminal sends the sidelink congestion information, so that the received value of the transmission parameter set is selected based on the sidelink congestion information, thereby alleviating congestion.

In another possible design, the group of values of the transmission parameter set may be one group of values that is selected from the at least two preset groups of values based on a transmission requirement set. The transmission requirement set includes at least one of a data packet length, a transmission delay, a transmission rate, a packet loss rate, a priority, and a quality of QCI level; at least one transmission requirement in the transmission requirement set has at least two levels; and each transmission requirement level corresponds to a group of values of the transmission parameter set, so that differentiated transmission specific to different transmission requirements can be implemented.

In one embodiment, if the group of values of the transmission parameter set is obtained from the network side device, the terminal receives a transmission requirement set sent by the network side device, and the terminal transmits data based on the value of the transmission parameter set corresponding to the transmission requirement set. For example, if the terminal obtains the transmission parameter, that is, the sending period, in the transmission parameter set from the network side device, and for a value of the sending period, a sending period of a large data packet whose data packet length is greater than or equal to 300 bytes is 500 ms (milliseconds), and a sending period of a small data packet whose data packet length is less than 300 bytes is 100 ms, the transmission requirement set sent by the network side device and received by the terminal includes the data packet length, and the terminal sends, at an interval of 500 ms, the large data packet whose data packet length is greater than or equal to 300 bytes, and sends, at an interval of 100 ms, the small data packet whose data packet length is less than 300 bytes.

In one embodiment, if the group of values of the transmission parameter set is one group of values that is selected by the terminal from the at least two preconfigured groups of values, the terminal selects, based on a preconfigured transmission requirement set, the group of values from the at least two groups of values that are preset for the transmission parameter set.

According to a third aspect, a network side device is provided. The network side device has a function of implementing the network side device in the foregoing method designs, and the function may be implemented by hardware, or may be implemented by executing corresponding software by hardware. The hardware or software includes one or more modules corresponding to the foregoing function. The module may be hardware and/or software. For example, the network side device includes a processing unit and a sending unit. The processing unit is configured to select a group of values from at least two preset groups of values for a transmission parameter set. The sending unit is configured to send the group of values that is selected by the processing unit.

A transmission parameter included in the transmission parameter set includes at least one of transmit power, a transmit power offset, a sending probability weight, a sending period, a quantity of retransmissions, an MCS level, and a resource pool configuration parameter; and the resource pool configuration parameter includes a resource pool period, a resource pool offset, and time-frequency resource information. At least one transmission parameter in the transmission parameter set has at least two values. One transmission parameter set may have different values at different points in time. Therefore, the network side device can adapt to different system statuses and service requirements, thereby improving transmission performance.

In one embodiment, the network side device further includes a receiving unit. The receiving unit is configured to: before the processing unit selects the group of values from the at least two preset groups of values for the transmission parameter set, obtain sidelink congestion information, to select the value based on the sidelink congestion information, thereby alleviating congestion.

In one embodiment, the sending unit is further configured to send a transmission requirement set after the processing unit selects the group of values from the at least two preset groups of values for the transmission parameter set. The transmission requirement set includes at least one of a data packet length, a transmission delay, a transmission rate, a packet loss rate, a priority, and a quality of service class identifier QCI level; at least one transmission requirement in the transmission requirement set has at least two levels; and each transmission requirement level corresponds to one group of values of the transmission parameter set, so that differentiated transmission specific to different transmission requirements can be implemented.

According to a fourth aspect, a terminal is provided. The terminal has a function of the terminal in the foregoing method design of obtaining a group of values of a transmission parameter set from a network side device, and the function may be implemented by hardware, or may be implemented by executing corresponding software by hardware. The hardware or software includes one or more modules corresponding to the foregoing function. The module may be software and/or hardware. For example, the terminal includes a receiving unit and a sending unit. The receiving unit is configured to receive a group of values that is of a transmission parameter set and that is sent by a network side device. The group of values is selected by the network side device from at least two groups of values that are preset for the transmission parameter set; a transmission parameter included in the transmission parameter set includes at least one of transmit power, a transmit power offset, a sending probability weight, a sending period, a quantity of retransmissions, an MCS level, and a resource pool configuration parameter; and at least one transmission parameter in the transmission parameter set has at least two values. The sending unit is configured to send communication data based on the group of values that is of the transmission parameter set and that is received by the receiving unit. One transmission parameter set may have different values at different points in time. Therefore, the terminal can adapt to different system statuses and service requirements, thereby improving transmission performance.

In one embodiment, the sending unit is further configured to send sidelink congestion information before the receiving unit receives the group of values that is of the transmission parameter set and that is sent by the network side device, so that the received value of the transmission parameter set is selected based on the sidelink congestion information, thereby alleviating congestion.

In one embodiment, the receiving unit is further configured to: before the sending unit sends the communication data based on the received group of values of the transmission parameter set, receive a transmission requirement set sent by the network side device. The transmission requirement set includes at least one of a data packet length, a transmission delay, a transmission rate, a packet loss rate, a priority, and a quality of QCI level; at least one transmission requirement in the transmission requirement set has at least two levels; and each transmission requirement level corresponds to one group of values of the transmission parameter set, so that differentiated transmission specific to different transmission requirements can be implemented.

According to a fifth aspect, a terminal is provided. The terminal has a function of the terminal in the foregoing method design of selecting a group of values of a transmission parameter set from at least two preconfigured groups of values, and the function may be implemented by hardware, or may be implemented by executing corresponding software by hardware. The hardware or software includes one or more modules corresponding to the foregoing function. The module may be software and/or hardware. For example, the terminal includes a processing unit and a sending unit. The processing unit is configured to select a group of values from at least two groups of values that are preset for a transmission parameter set. The sending unit is configured to send communication data based on the group of values of the transmission parameter set.

Each group of values of the at least two groups of values includes a value of each transmission parameter in the transmission parameter set; and at least one transmission parameter in the transmission parameter set has at least two values.

The transmission parameter included in the transmission parameter set includes at least one of transmit power, a transmit power offset, a sending probability weight, a sending period, a quantity of retransmissions, a modulation and coding scheme MCS level, and a resource pool configuration parameter; and the resource pool configuration parameter includes a resource pool period, a resource pool offset, and time-frequency resource information.

In a possible design, the processing unit is further configured to: before selecting the group of values from the at least two groups of values that are preset for the transmission parameter set, measure a status of a sidelink and determine, based on a measurement result, whether the sidelink is in a congested state.

In one embodiment, the processing unit is configured to select, in the following manner, the group of values from the at least two groups of values that are preset for the transmission parameter set:

selecting, based on a preconfigured transmission requirement set, the group of values from the at least two groups of values that are preset for the transmission parameter set, where the transmission requirement set includes at least one of a data packet length, a transmission delay, a transmission rate, a packet loss rate, a priority, and a quality of service class identifier QCI level; at least one transmission requirement in the transmission requirement set has at least two levels; and each transmission requirement level corresponds to one group of values of the transmission parameter set.

DESCRIPTION OF EMBODIMENTS

The following describes the technical solutions in the embodiments of the present invention in detail with reference to accompanying drawings in the embodiments of the present invention.

A communication method provided in the embodiments of the present invention may be applied to a communication scenario of direct communication between two devices, for example, a D2D communication scenario, or a V2V communication scenario, or a V2X communication scenario. In the embodiments of the present invention, a device that performs direct communication may include various handheld devices having a wireless communication function, an in-vehicle device, a wearable device, a computing device, another processing device connected to a wireless modem, user equipments (UEs) in various forms, a mobile station (MS), a terminal, a terminal device (Terminal Equipment). For ease of description, in the embodiments of the present invention, a device that performs direct communication is referred to as a terminal below.

Figure 1:
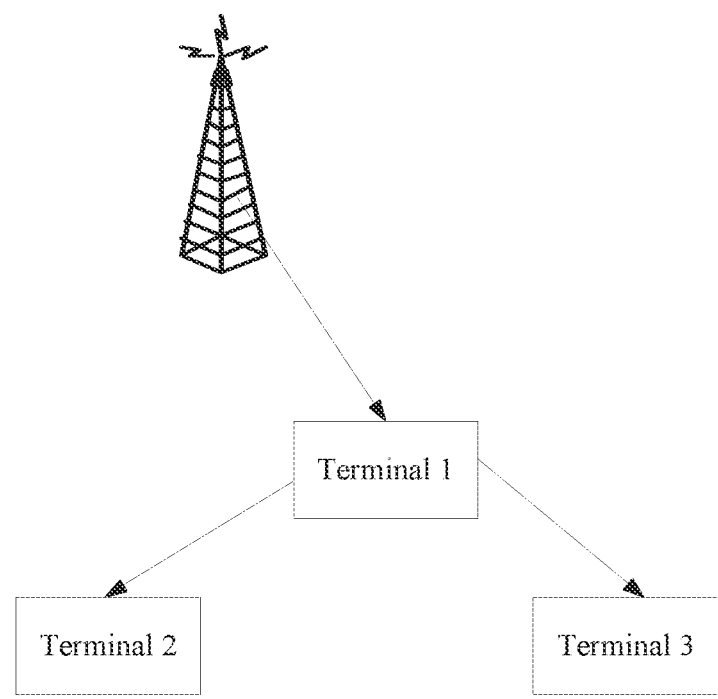
FIG. 1 is a schematic diagram of a scenario that is of direct communication between terminals and to which an embodiment of the present invention is applicable.

FIG. 1 is a schematic diagram of a scenario of direct communication between terminals according to one embodiment. A network side device configures various transmission parameters for data transmission for a terminal 1, and the terminal 1, serving as a data transmitter, performs terminal-to-terminal communication with a terminal 2 and a terminal 3. In the embodiments of the present invention, the network side device is an apparatus deployed in a radio access network and providing a wireless communication function for a terminal, and may be a base station (BS), for example, may include macro base stations, micro base stations, relay stations, and access points in various forms. In a system using different radio access technologies, devices having a function of a base station may have different names, for example, in a Long Term Evolution (LTE) network, the device is referred to as an evolved NodeB (eNB or eNodeB), and in a third generation 3G network, the device is referred to as a NodeB.

Links for communication between the network side device and the terminal are an uplink and a downlink, and a link between terminals is a sidelink. In terminal-to-terminal communication, the network side device may transmit signaling by using the uplink and the downlink to configure a resource pool, or transmit control signaling by using the uplink and the downlink, to configure a specific time-frequency resource for sending and a transmission parameter for a terminal serving as a transmit end, to control the terminal-to-terminal communication. When a relatively large quantity of terminals need to transmit D2D communication data in a communications system, but there are no sufficient resources available for transmission in the communications system, a relatively high transmission delay or a relatively high transmission bit error rate is caused. Consequently, system performance degrades. Alternatively, when each terminal randomly selects a transmission resource from a resource pool configured on a network side, to transmit data, when a relatively large quantity of terminals need to transmit D2D communication data in the communications system, a probability of causing a transmission conflict is increased. Consequently, transmission performance degrades.

In one embodiment, the network side device configures at least two groups of values for a transmission parameter set. The transmission parameter set includes at least one element. If the transmission parameter set includes one element, namely, includes one item, each group of values of the at least two groups of values includes a value corresponding to the item. If the transmission parameter set includes more than one element, namely, more than one item, each group of values of the at least two groups of values includes a plurality of values respectively corresponding to various items in the transmission set. One transmission parameter set may have different values at different points in time, and the network side device selects one group of values from the at least two groups of values, as a value of the transmission parameter set, and sends the group of values. The present invention can adapt to different system statuses and service requirements, thereby improving transmission performance.

In the present invention, a communication method and an apparatus that are provided in embodiments of the present invention are described in detail below with reference to specific embodiments.

An embodiment of the present invention provides a network side device. The network side device may select a group of values from at least two preset groups of values for a transmission parameter set, and send the selected group of values.

A function of the network side device may be implemented by hardware, or may be implemented by executing corresponding software by hardware.

Figure 2:
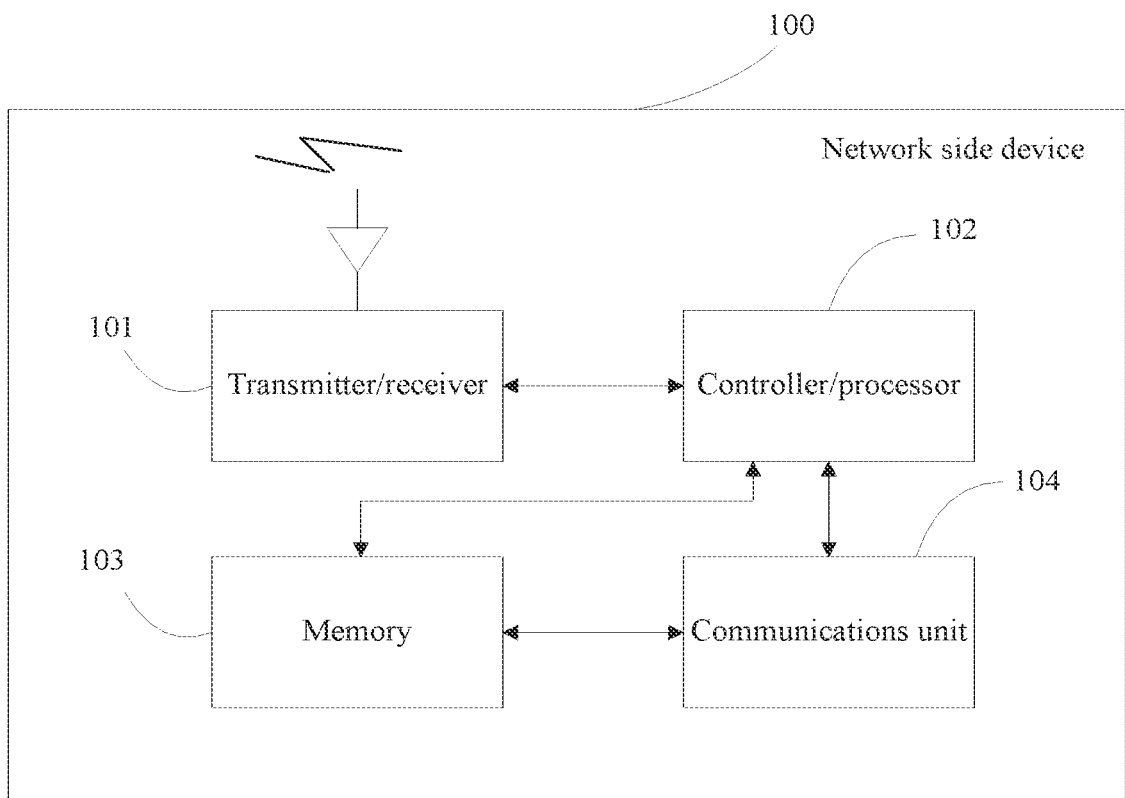
FIG. 2 is a schematic structural diagram of a network side device according to an embodiment of the present invention.

FIG. 2 is a schematic structural diagram of a network side device 100 according to an embodiment of the present invention. As shown in FIG. 2, the network side device 100 includes a transmitter/receiver 101, a controller/processor 102, a memory 103, and a communications unit 104. In this embodiment of the present invention, the memory 103 is configured to store program code to be executed by the controller/processor 102;

the controller/processor 102 is configured to: invoke a program stored in the memory 103, select a group of values from at least two preset groups of values for a transmission parameter set, and send, by using the transmitter/receiver 101, the group of values that is selected for the transmission parameter;

the transmitter/receiver 101 is configured to send the group of values that is selected for the transmission parameter; and the communications unit 104 is configured to support communication between the network side device and another network entity.

A transmission parameter included in the transmission parameter set includes at least one of transmit power, a transmit power offset, a sending probability weight, a sending period, a quantity of retransmissions, a modulation and coding scheme MCS level, and a resource pool configuration parameter; and the resource pool configuration parameter includes a resource pool period, a resource pool offset, and time-frequency resource information.

Each group of values of the at least two groups of values includes a value of each transmission parameter in the transmission parameter set; and at least one transmission parameter in the transmission parameter set has at least two values. One transmission parameter set may have different values at different points in time. Therefore, the network side device can adapt to different system statuses and service requirements, thereby improving transmission performance.

In one embodiment, the controller/processor 102 of the network side device 100 is further configured to obtain sidelink congestion information by using the transmitter/receiver 101, to select the value based on the sidelink congestion information, thereby alleviating congestion.

In one embodiment, the controller/processor 102 of the network side device 100 is further configured to send a transmission requirement set by using the transmitter/receiver 101. The transmission requirement set includes at least one of a data packet length, a transmission delay, a transmission rate, a packet loss rate, a priority, and a QCI level; at least one transmission requirement in the transmission requirement set has at least two levels; and each transmission requirement level corresponds to one group of values of the transmission parameter set, so that differentiated transmission specific to different transmission requirements can be implemented.

The hardware or software, used for performing a corresponding function, in the network side device in this embodiment of the present invention includes one or more modules corresponding to the foregoing function. The module may be software and/or hardware.

Figure 3A:
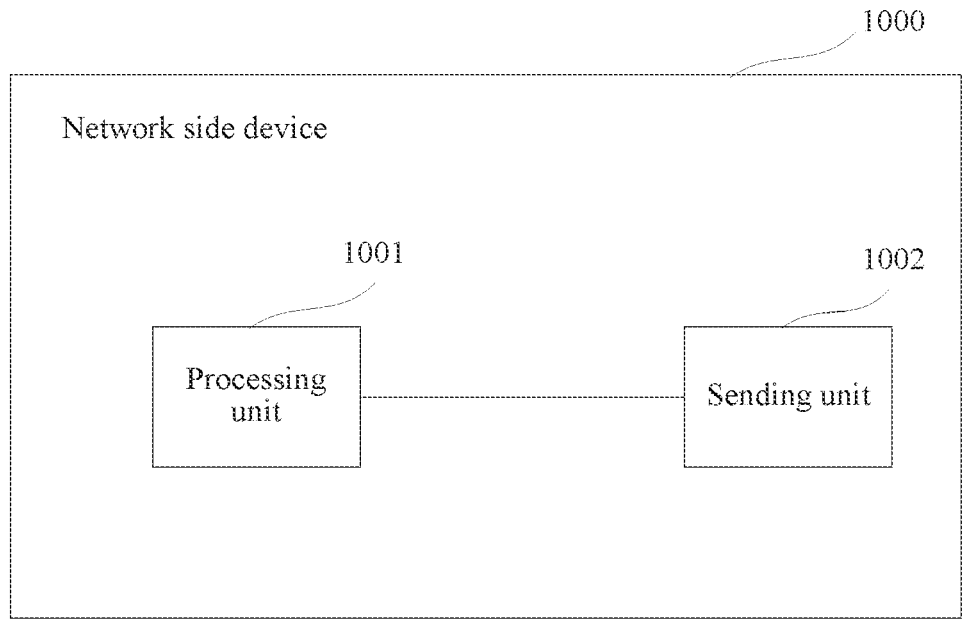
FIG. 3A and FIG. 3B are other schematic structural diagrams of a network side device according to an embodiment of the present invention.

FIG. 3A is a schematic structural diagram of a network side device 1000 according to an embodiment of the present invention. As shown in FIG. 3A, the network side device 1000 includes a processing unit 1001 and a sending unit 1002. The processing unit 1001 is configured to select a group of values from at least two preset groups of values for a transmission parameter set. The sending unit 1002 is configured to send the group of values that is selected by the processing unit 1001.

The transmission parameter set may be the transmission parameter set described in the foregoing embodiment, for example, the transmission parameter set used for the network side device 100. One transmission parameter set may have different values at different points in time. Therefore, the network side device can adapt to different system statuses and service requirements, thereby improving transmission performance.

Figure 3B:
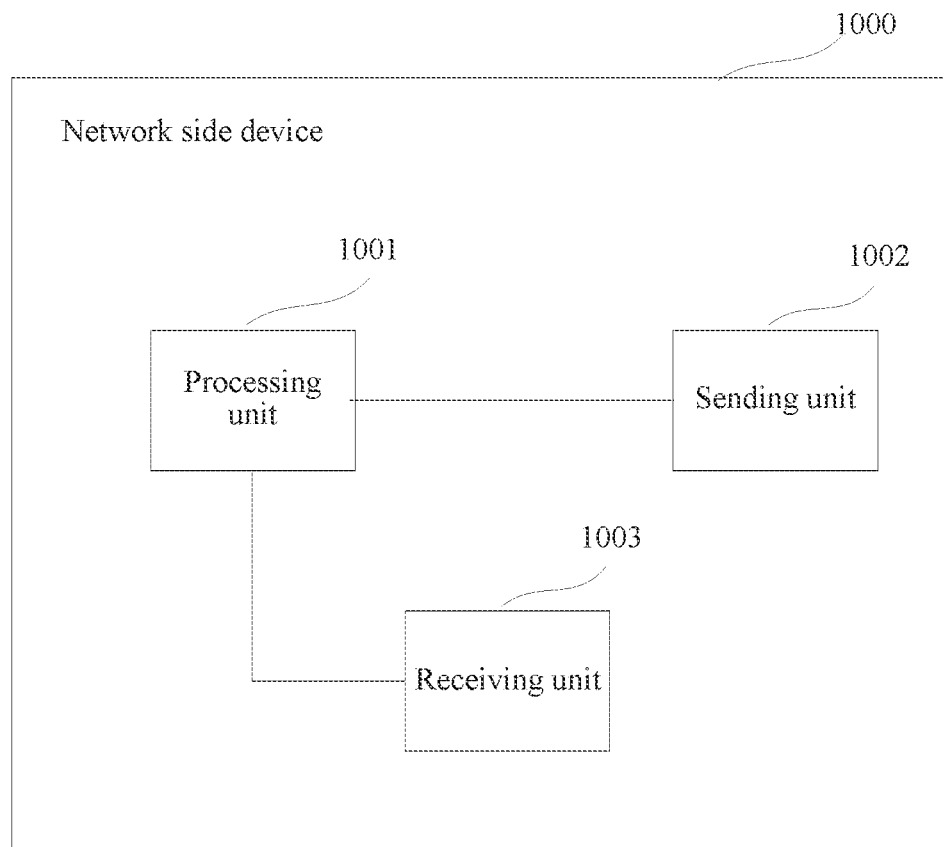

In one embodiment, the network side device 1000 further includes a receiving unit 1003, as shown in FIG. 3B. The receiving unit 1003 is configured to: before the processing unit 1001 selects the group of values from the at least two preset groups of values for the transmission parameter set, obtain sidelink congestion information, to select the value based on the sidelink congestion information, thereby alleviating congestion.

In this embodiment of the present invention, the sending unit 1002 is further configured to: after the processing unit 1001 selects the group of values from the at least two preset groups of values for the transmission parameter set, send a transmission requirement set.

The transmission requirement set may be the transmission requirement set described in the foregoing embodiment, for example, the transmission requirement set used for the network side device 100. At least one transmission requirement in the transmission requirement set has at least two levels; and each transmission requirement level corresponds to one group of values of the transmission parameter set, so that differentiated transmission specific to different transmission requirements can be implemented.

An embodiment of the present invention further provides a terminal. The terminal has functions of receiving a group of values that is of a transmission parameter set and that is sent by a network side device, and sending communication data based on the received group of values of the transmission parameter set.

The function of the terminal in this embodiment of the present invention may be implemented by hardware, or may be implemented by executing corresponding software by hardware.

Figure 4:
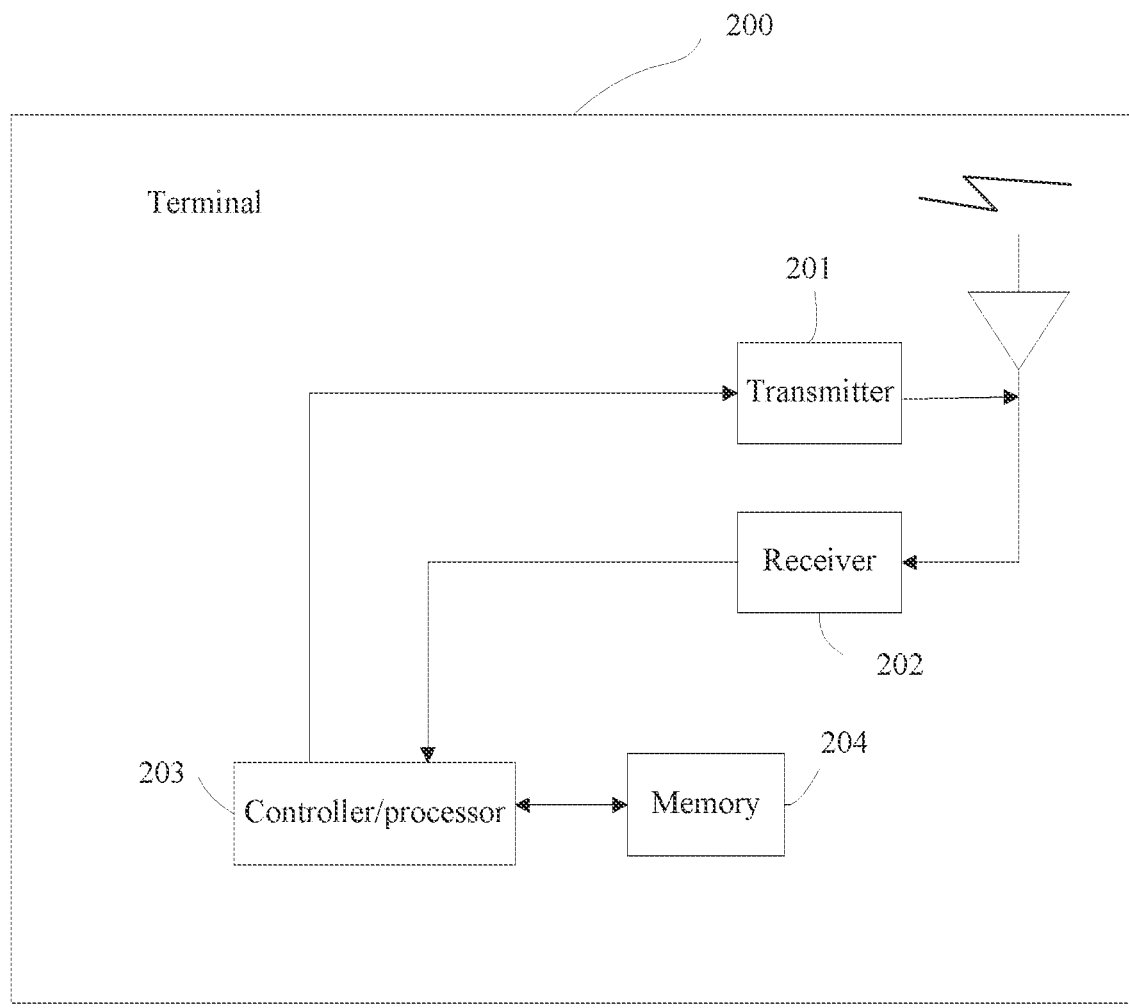
FIG. 4 is a schematic structural diagram of a terminal according to an embodiment of the present invention.

FIG. 4 is a schematic structural diagram of a terminal 200 according to an embodiment of the present invention. As shown in FIG. 4, the terminal 200 includes a transmitter 201, a receiver 202, a controller/processor 203, and a memory 204.

The memory 204 is configured to store program code to be executed by the controller/processor 203.

The controller/processor 203 is configured to: invoke a program stored in the memory 204, receive, by using the receiver 202, a group of values that is of a transmission parameter set and that is sent by a network side device, and send communication data based on the received group of values of the transmission parameter set by using the transmitter 201.

The group of values is selected by the network side device from at least two groups of values that are preset for the transmission parameter set. The transmission parameter set may be the transmission parameter set described in the foregoing embodiment, for example, the transmission parameter set used for the network side device 100. One transmission parameter set may have different values at different points in time. Therefore, the terminal can adapt to different system statuses and service requirements, thereby improving transmission performance.

The receiver 202 is configured to receive a group of values that is of the transmission parameter set and that is sent by the network side device.

The transmitter 201 is configured to send the communication data based on the received group of values of the transmission parameter set.

In one embodiment, the controller/processor 203 of the terminal 200 is further configured to: before receiving the group of values that is of the transmission parameter set and that is sent by the network side device, send sidelink congestion information by using the transmitter 201, so that the received value of the transmission parameter set is selected based on the sidelink congestion information, thereby alleviating congestion.

In one embodiment, the controller/processor 203 of the terminal 200 is further configured to: before sending the communication data based on the received group of values of the transmission parameter set, receive, by using the receiver 202, a transmission requirement set sent by the network side device, to implement differentiated transmission specific to different transmission requirements.

The hardware or software, used for performing a corresponding function, in the terminal in this embodiment of the present invention includes one or more modules corresponding to the foregoing function. The module may be software and/or hardware.

Figure 5:
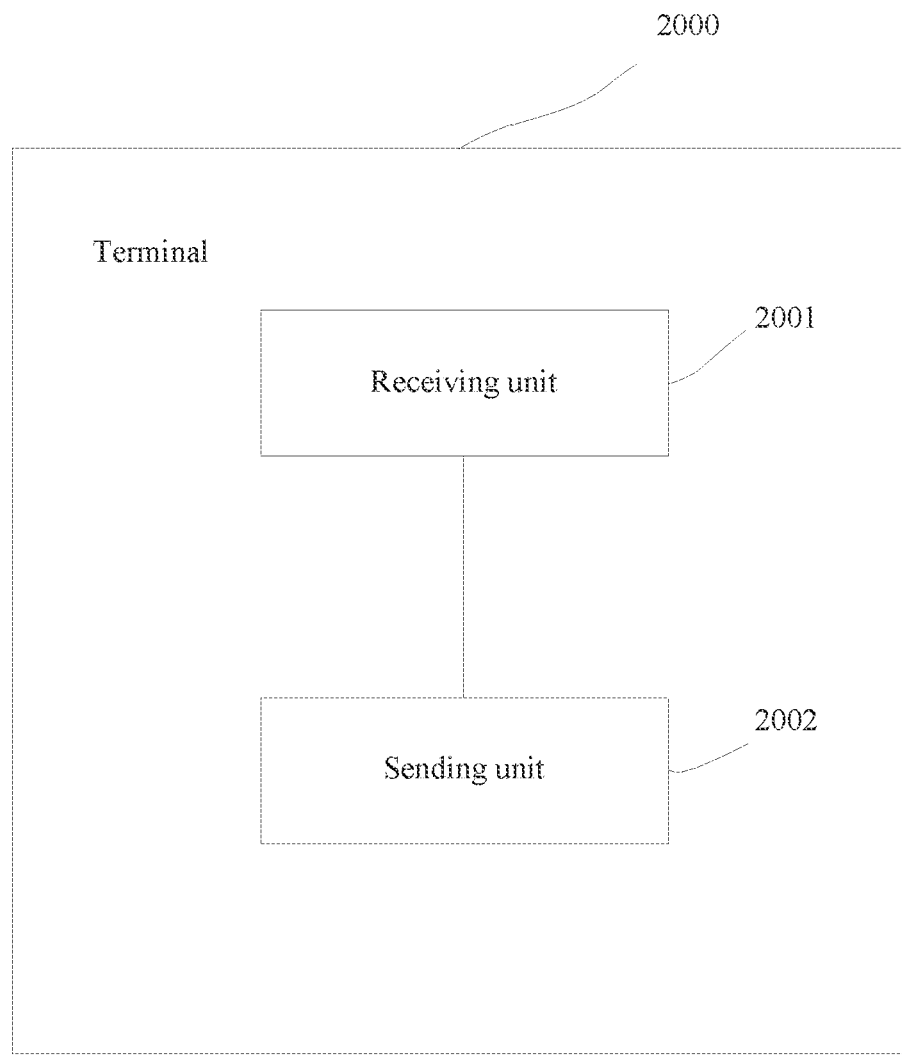
FIG. 5 is another schematic structural diagram of a terminal according to an embodiment of the present invention.

FIG. 5 is a schematic structural diagram of a terminal 2000 according to an embodiment of the present invention. As shown in FIG. 5, the terminal 2000 includes a receiving unit 2001 and a sending unit 2002. The receiving unit 2001 is configured to receive a group of values that is of a transmission parameter set and that is sent by a network side device. The sending unit 2002 is configured to send communication data based on the group of values that is of the transmission parameter set and that is received by the receiving unit 2001.

The group of values is selected by the network side device from at least two groups of values that are preset for the transmission parameter set. The transmission parameter set may be the transmission parameter set described in the foregoing embodiment, for example, the transmission parameter set used for the network side device 100. One transmission parameter set may have different values at different points in time. Therefore, the terminal can adapt to different system statuses and service requirements, thereby improving transmission performance.

In one embodiment, the sending unit 2002 is further configured to: before the receiving unit 2001 receives the group of values that is of the transmission parameter set and that is sent by the network side device, send sidelink congestion information, so that the received value of the transmission parameter set is selected based on the sidelink congestion information, thereby alleviating congestion.

In one embodiment, the receiving unit 2001 is further configured to: before the sending unit 2002 sends the communication data based on the received group of values of the transmission parameter set, receive a transmission requirement set sent by the network side device.

The transmission requirement set may be the transmission requirement set described in the foregoing embodiment, for example, the transmission requirement set used for the network side device 100. At least one transmission requirement in the transmission requirement set has at least two levels; and each transmission requirement level corresponds to one group of values of the transmission parameter set, so that differentiated transmission specific to different transmission requirements can be implemented.

An embodiment of the present invention further provides another terminal. The terminal has functions of selecting one group of values from at least two preconfigured groups of values of a transmission parameter set, and sending communication data based on the group of values of the transmission parameter set.

The function of the terminal in this embodiment of the present invention may be implemented by hardware, or may be implemented by executing corresponding software by hardware.

Figure 6:
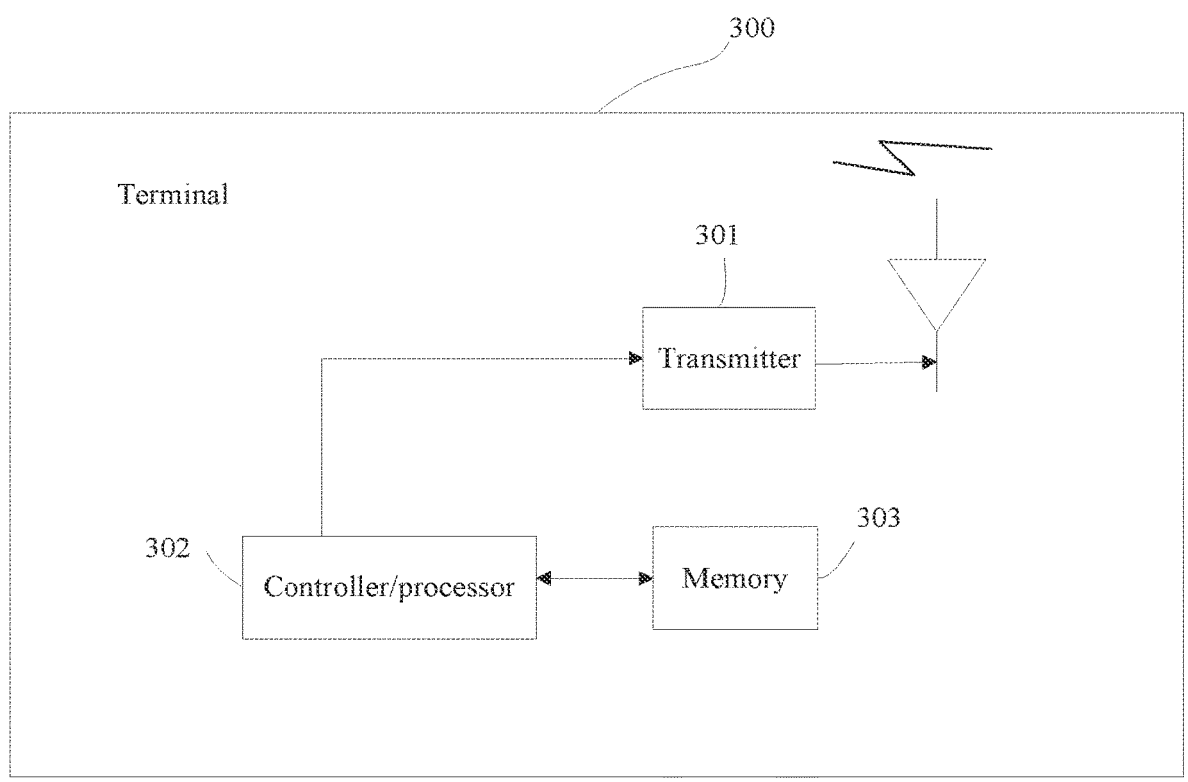
FIG. 6 is a schematic structural diagram of another terminal according to an embodiment of the present invention.

FIG. 6 is a schematic structural diagram of another terminal 300 according to an embodiment of the present invention. As shown in FIG. 6, the terminal 300 includes a transmitter 301, a controller/processor 302, and a memory 303.

The memory 303 is configured to store program code to be executed by the controller/processor 302.

The controller/processor 302 is configured to: invoke a program stored in the memory 303, select a group of values from at least two groups of values that are preset for a transmission parameter set, and send, by using the transmitter 301, communication data based on the selected group of values of the transmission parameter set.

Each group of values of the at least two groups of values includes a value of each transmission parameter in the transmission parameter set; and at least one transmission parameter in the transmission parameter set has at least two values.

The transmission parameter included in the transmission parameter set includes at least one of transmit power, a transmit power offset, a sending probability weight, a sending period, a quantity of retransmissions, an MCS level, and a resource pool configuration parameter; and the resource pool configuration parameter includes a resource pool period, a resource pool offset, and time-frequency resource information.

In one embodiment, the controller/processor 302 of the terminal 300 is further configured to: before selecting the group of values from the at least two groups of values that are preset for the transmission parameter set, measure a status of a sidelink; and determine, based on a measurement result, whether the sidelink is in a congested state.

In one embodiment, the controller/processor 302 is specifically configured to select, in the following manner, the group of values from the at least two groups of values that are preset for the transmission parameter set:

selecting, based on a preconfigured transmission requirement set, the group of values from the at least two groups of values that are preset for the transmission parameter set, where the transmission requirement set includes at least one of a data packet length, a transmission delay, a transmission rate, a packet loss rate, a priority, and a QCI level; at least one transmission requirement in the transmission requirement set has at least two levels; and each transmission requirement level corresponds to one group of values of the transmission parameter set.

The hardware or software, used for performing a corresponding function, in the terminal in this embodiment of the present invention includes one or more modules corresponding to the foregoing function. The module may be software and/or hardware.

Figure 7:
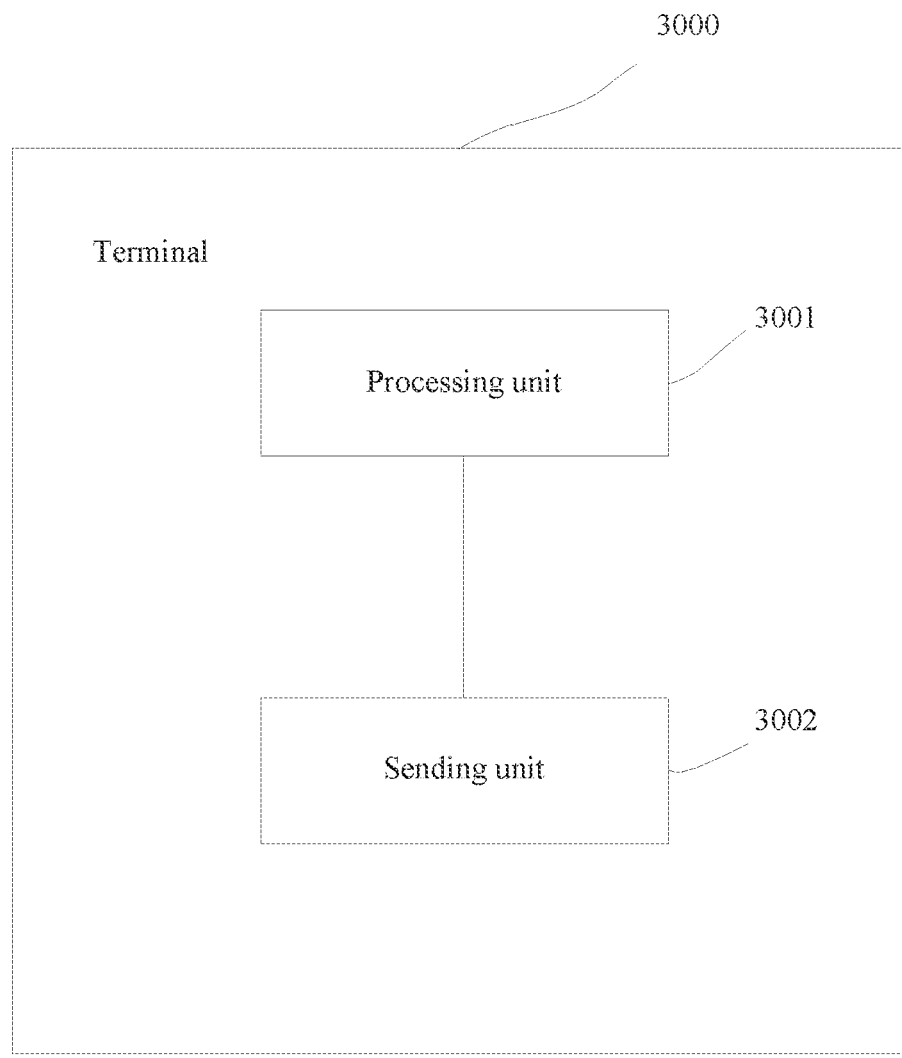
FIG. 7 is another schematic structural diagram of another terminal according to an embodiment of the present invention.

FIG. 7 is a schematic structural diagram of a terminal 3000 according to an embodiment of the present invention. As shown in FIG. 7, the terminal 3000 includes a processing unit 3001 and a sending unit 3002. The processing unit 3001 is configured to select a group of values from at least two groups of values that are preset for a transmission parameter set. The sending unit 3002 is configured to send communication data based on the group of values of the transmission parameter set.

Each group of values of the at least two groups of values includes a value of each transmission parameter in the transmission parameter set; and at least one transmission parameter in the transmission parameter set has at least two values. The transmission parameter set may be the transmission parameter set described in the foregoing embodiment, for example, the transmission parameter set used for the network side device 300. One transmission parameter set may have different values at different points in time. Therefore, the terminal can adapt to different system statuses and service requirements, thereby improving transmission performance.

In one embodiment, the processing unit 3001 is further configured to: before selecting the group of values from the at least two groups of values that are preset for the transmission parameter set, measure a status of a sidelink; and determine, based on a measurement result, whether the sidelink is in a congested state.

In one embodiment, the processing unit 3001 is specifically configured to select, in the following manner, the group of values from the at least two groups of values that are preset for the transmission parameter set:

selecting, based on a preconfigured transmission requirement set, the group of values from the at least two groups of values that are preset for the transmission parameter set, where the transmission requirement set includes at least one of a data packet length, a transmission delay, a transmission rate, a packet loss rate, a priority, and a QCI level; at least one transmission requirement in the transmission requirement set has at least two levels; and each transmission requirement level corresponds to one group of values of the transmission parameter set.

It should be noted that, the controller/processor of the foregoing network side device and terminal may be a general central processing unit (CPU), a microprocessor, an application-specific integrated circuit (ASIC), or one or more integrated circuits configured to control execution of a program in the solutions of the present invention. One or more memories included in a computer system may be a read-only memory (ROM) or another type of static storage device that can store static information and an instruction, a random access memory (RAM) or another type of dynamic storage device that can store information and an instruction, or may be a magnetic disk storage. These memories are connected to the processor by using a bus.

It may be understood that, structures of the network side device and the terminal in the accompanying drawings in the foregoing embodiments are merely simplified designs of the network side device and the terminal, and are not limited thereto. During actual application, the network side device may include any quantity of transmitters, receivers, processors, controllers, memories, communications units, and the like; and the terminal may further include a coder, a modulator, a demodulator, a decoder, and the like.

In the embodiments of the present invention, implementation of a communication method for differentiated transmission in an embodiment of the present invention by the network side device and the terminal is described in detail below.

Figure 8:
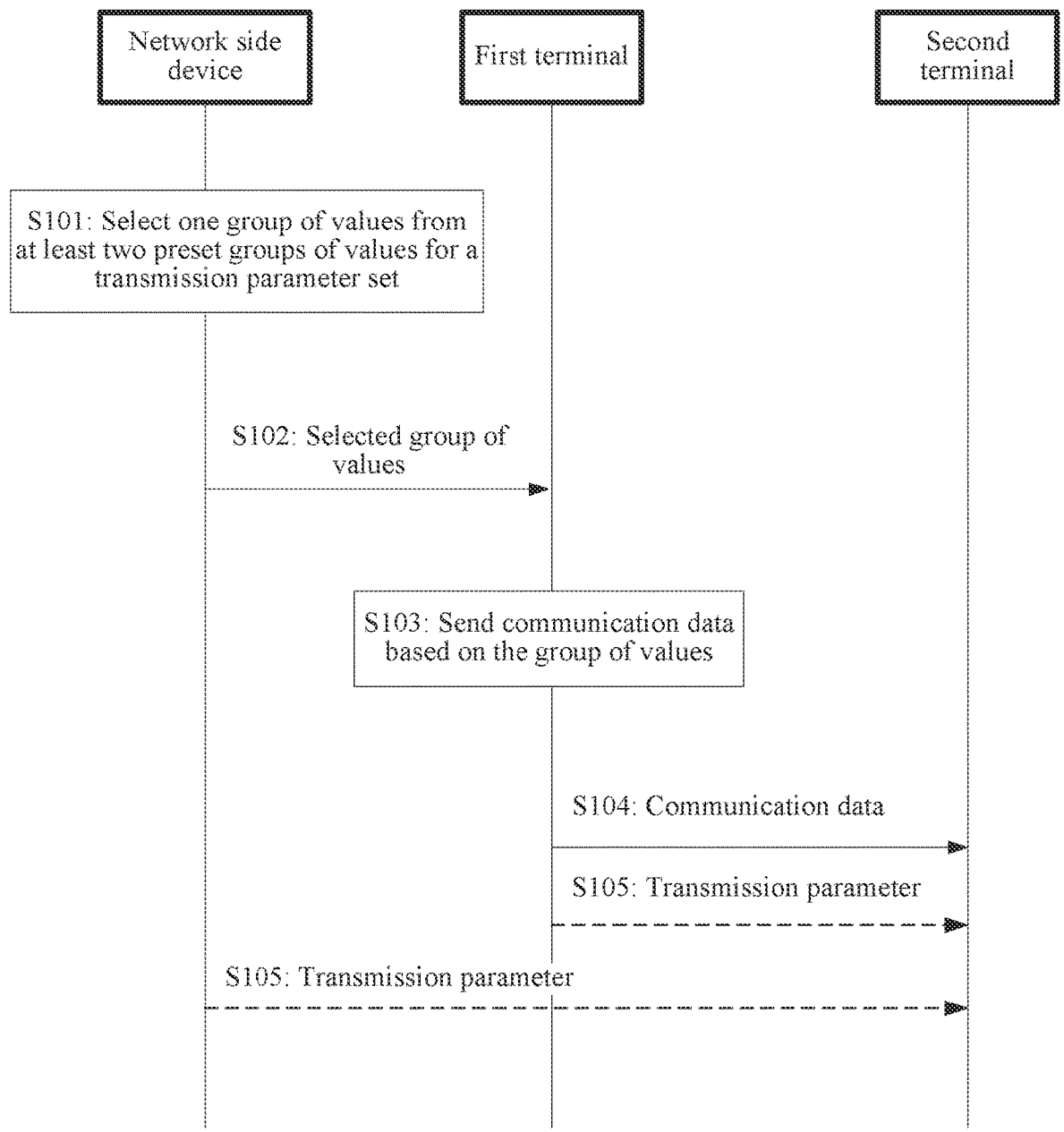
FIG. 8 is a flowchart of a communication method according to an embodiment of the present invention.

FIG. 8 is a schematic flowchart of a communication method according to an embodiment of the present invention. As shown in FIG. 8, the method includes the following operations.

Operation S101: A network side device selects one group of values from at least two preset groups of values for a transmission parameter set.

In this embodiment of the present invention, a transmission parameter included in the transmission parameter set may include one or more of the following transmission parameters: transmit power, a transmit power offset, a sending probability weight, a sending period, a quantity of retransmissions, an MCS level, and a resource pool configuration parameter; and the resource pool configuration parameter includes a resource pool period, a resource pool offset, time-frequency resource information, and the like. The transmission parameter includes, but is not limited to, the foregoing transmission parameters.

At least one transmission parameter in the transmission parameter set has at least two preset values. One or more transmission parameters form the transmission parameter set. Different values of the one or more transmission parameters form a plurality of groups of values. Each group of values includes a value of each transmission parameter in the transmission parameter set. For example, if the transmission parameter set includes one transmission parameter, e.g., the transmit power, the transmit power forms the transmission parameter set, and the transmit power has at least two different values. Each value of the transmit power represents a group of values of the transmission parameter set, and the at least two different values of the transmit power form the at least two groups of values of the transmission parameter set. If the parameter set includes two transmission parameters: the transmit power and the sending period, the transmit power and the sending period form the transmission parameter set. Values of the transmit power and the sending period may be as follows: The transmit power has at least two values, and the sending period has one value; or the transmit power has one value, and the sending period has at least two values; or both the transmit power and the sending period have at least two values. Various combinations of the value of the transmit power and the value of the sending period form a plurality of groups of values of the transmission parameter set. For example, if the transmit power has at least two values A and B, and the sending period has one value C, two groups of values may be preset for the transmission parameter set, where the value A of the transmit power and the value C of the sending period are used as one group of values, and the value B of the transmit power and the value C of the sending period are used as the other group of values. A case in which the transmission parameter set includes more than two transmission parameters is similar to this, and details are not described herein again.

In this embodiment of the present invention, for the transmission parameter in the transmission parameter set, a value may be set and a value may be selected in the following manner:

Preset values of the transmit power include at least two values, for example, include P1 and P2, and the network side device selects one value from the at least two values, for example, may select the value P1 from P1 and P2.

Alternatively, preset values of the transmit power offset include at least two values, for example, include $\Delta P1$ and $\Delta P2$, and the network side device selects one value from the at least two values, for example, may select $\Delta P1$ from $\Delta P1$ and $\Delta P2$.

Alternatively, preset values of the sending probability weight include at least two values, for example, include X1=1 and X2=0.5, and the network side device selects one value from the at least two values, for example, may select X2=0.5 from X1=1 and X2=0.5 (a sending probability of each data packet is reduced to 0.5).

Alternatively, preset values of the sending period include at least two values, for example, include T1=100 ms and T2=200 ms, and the network side device selects one value from the at least two values, for example, may select T1=100 ms from T1=100 ms and T2=200 ms (each data packet is sent at an interval of 100 ms).

Alternatively, preset values of the quantity of retransmissions include at least two parameters, for example, include N1=3, N2=1, and N3=0, and the network side device selects one value from the at least two values, for example, may select N1=3 from N1=3, N2=1, and N3=0 (that is, each data packet is transmitted four times: each data packet is first to be transmitted once, and then is to be retransmitted three times, that is, the data packet is transmitted four times in total).

Alternatively, preset values of the MCS level include at least two values, for example, include 32 MCS levels that respectively correspond to MCS=0 to MCS=31, and the network side device selects one value from the at least two values, for example, may select MCS=6 from the 32 MCS levels (each data packet is sent at the MCS level 6).

Alternatively, preset values of the resource pool configuration parameter include at least two groups of values, for example, include C1 and C2. Each group of values of the at least two groups of values is a group of resource pool configuration related parameters. For example, a resource pool corresponding to the value C1 has a period of 20 ms and an offset of 0, available subframes in the resource pool are all subframes, and available frequency domain resources are all physical resource blocks corresponding to a system bandwidth; a resource pool corresponding to the value C2 has a period of 40 ms and an offset of 0, available subframes are all subframes, and available frequency domain resources are six physical resource blocks corresponding to a system bandwidth. The network side device selects one value from the at least two values, for example, may select C1 from C1 and C2.

In this embodiment of the present invention, if the transmission parameter set includes one transmission parameter, the selecting a group of values from at least two preset groups of values may be understood as selecting one of at least two values of one of the foregoing various transmission parameters. For example, if the transmission parameter set includes the transmit power, and a value is selected for the transmit power in the manner in the foregoing example, the selected group of values is P1. If the transmission parameter set includes a plurality of transmission parameters, the selecting one group of values from at least two preset groups of values may be understood as selecting one group from a plurality of groups of values obtained by randomly combining different values of at least two of the foregoing various transmission parameters. For example, if the transmission parameter set includes all the foregoing transmission parameters, and a value is selected for each transmission parameter in the manner in the foregoing example, the selected group of values is P1, $\Delta$P1, X2=0.5, T1=100 ms, N1=3, MCS=6, and C1.

In this embodiment of the present invention, the network side device may select one group of values from the at least two preset groups of values depending on an actual requirement.

Operation S102: The network side device sends the selected group of values.

The network side device may send the transmission parameter in a broadcast mode, or send the transmission parameter by using Radio Resource Control (RRC) signaling, or send the transmission parameter by using control signaling. The control signaling is classified into common control signaling and user-specific control signaling.

The network side device may send the transmission parameter in a broadcast mode by using the common control signaling, so that all terminals in a cell have a same parameter. The network side device sends the parameter by using the RRC signaling or the user-specific control signaling, so that different terminals may have different parameters.

For example, if the network side device selects N1=3 for the quantity of retransmissions, and sends, in a broadcast mode, the value selected for the quantity of retransmissions, data transmitted by all the terminals in the cell is to be retransmitted three times. If the network side device selects N1=3 and N2=1 for the quantity of retransmissions, and sends, by using dedicated control signaling, the values selected for the quantity of retransmissions, that is, transmits the quantity N1 of retransmissions to a terminal 1 and transmits the quantity N2 of retransmissions to a terminal 2 by using the dedicated control signaling, data transmitted by the terminal 1 is to be retransmitted three times, and data transmitted by the terminal 2 is to be retransmitted once.

Operation S103: A first terminal receives the selected group of values, and sends communication data based on the received group of values of the transmission parameter set.

In this embodiment of the present invention, for ease of description, a terminal serving as a transmit end is referred to as the first terminal, and a terminal serving as a receive end is referred to as a second terminal.

Operation S104: A second terminal receives communication data sent by the first terminal.

To correctly receive the communication data sent by the first terminal, the second terminal needs to obtain some particular transmission parameters, for example, resource pool configuration information. Therefore, optionally, the method may further include the following operation:

Operation S105: The second terminal obtains a transmission parameter.

The second terminal may obtain the required transmission parameter from the network side device, or may obtain the required transmission parameter from the first terminal.

In this embodiment of the present invention, the network side device preconfigures at least two groups of values for a same transmission parameter set, selects one group of values from the at least two groups of values as a value of the transmission parameter set, and sends the group of values. One transmission parameter may have different values at different points in time, thereby improving transmission performance.

A typical application scenario of the communication method provided in this embodiment of the present invention may be a scenario in which during direct communication between two terminals, congestion occurs on a sidelink. In this case, before selecting the group of values from the at least two groups of values that are preset for the transmission parameter, the network side device obtains sidelink congestion information, and selects the value based on the sidelink congestion information, thereby alleviating congestion. An implementation process is shown in FIG. 9.

Figure 9:
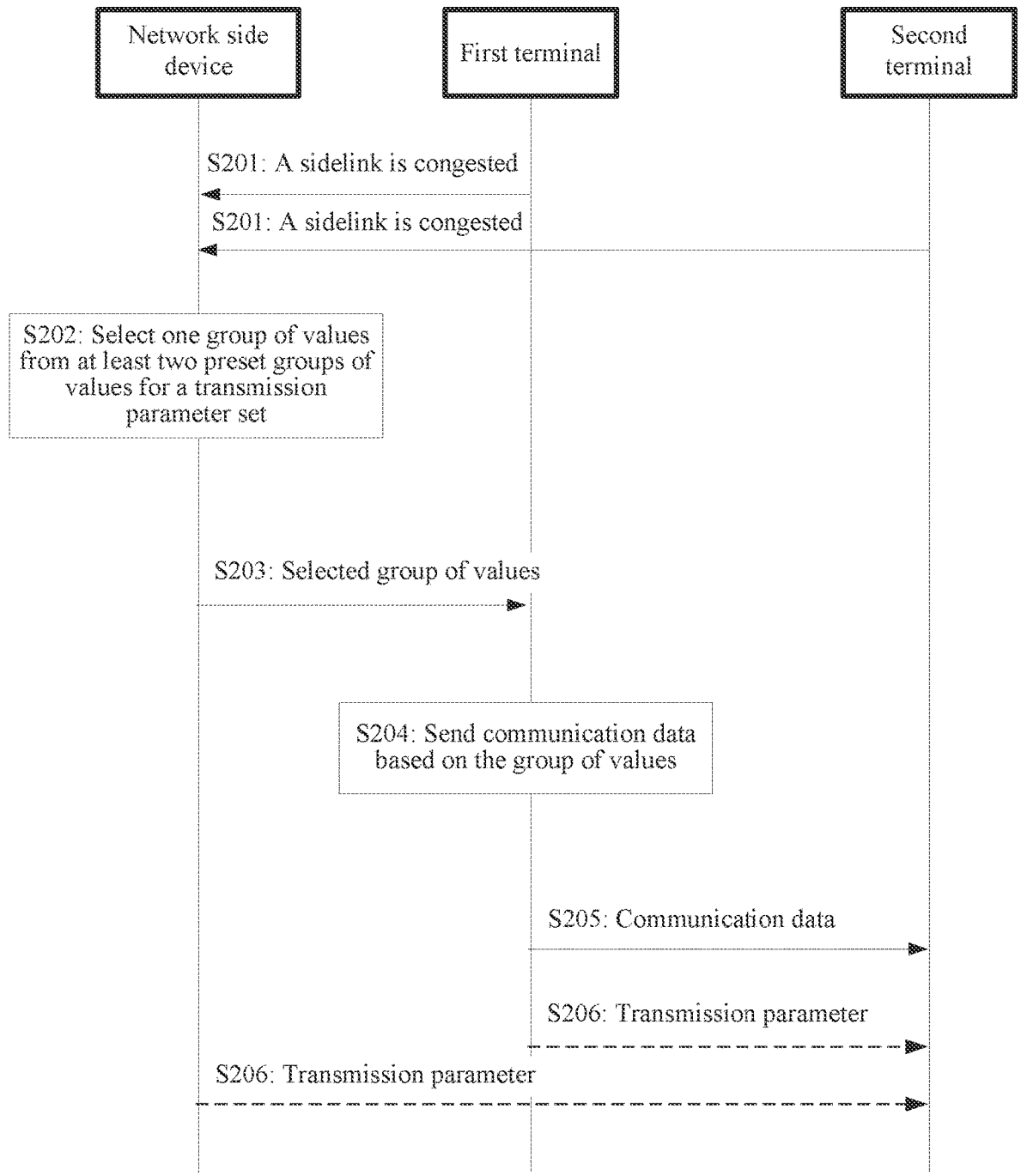
FIG. 9 is another flowchart of a communication method according to an embodiment of the present invention.

In a method procedure shown in FIG. 9, operations S202, S203, S204, and S205 are respectively the same as operations S101, S102, S103, and S104 in FIG. 8. A difference from FIG. 8 lies in that, before the selecting a value for a transmission parameter set, the method further includes the following operation:

Operation S201: The network side device obtains sidelink congestion information.

The terminal sends data on the sidelink. When a volume of data sent by a plurality of terminals is relatively large, data packet transmission performance degrades, that is, data packet receiving accuracy is lowered. Such a phenomenon may be considered as congestion. In this embodiment of the present invention, the sidelink congestion information may be an interference level, an energy level, an RSRP value, resource usage, or the like of the sidelink that is measured and reported by the terminal and obtained by the network side device, or may be whether resource usage of the sidelink that is measured by the network side device exceeds a threshold, for example, whether the resource usage exceeds 50% or 80%; and if the threshold is exceeded, it is considered that the sidelink is congested; otherwise, the sidelink is not congested.

Optionally, FIG. 9 may include operation S206 that is the same as operation S105, namely, the step of obtaining, by the second terminal, a transmission parameter.

Another typical application scenario of the communication method provided in this embodiment of the present invention may be a scenario of differentiated transmission specific to different transmission requirements. The network side device selects a group of values based on a transmission requirement set. The transmission requirement set may include one or more of a data packet length, a transmission delay, a transmission rate, a packet loss rate, a priority, and a quality of QCI; and at least one transmission requirement in the transmission requirement set has at least two levels. One or more of the foregoing transmission requirements form the transmission requirement set, and different values of the one or more transmission requirements form a plurality of groups of transmission requirement levels. Different transmission requirement levels correspond to different groups of values, thereby implementing differentiated transmission specific to different transmission requirements.

Figure 10:
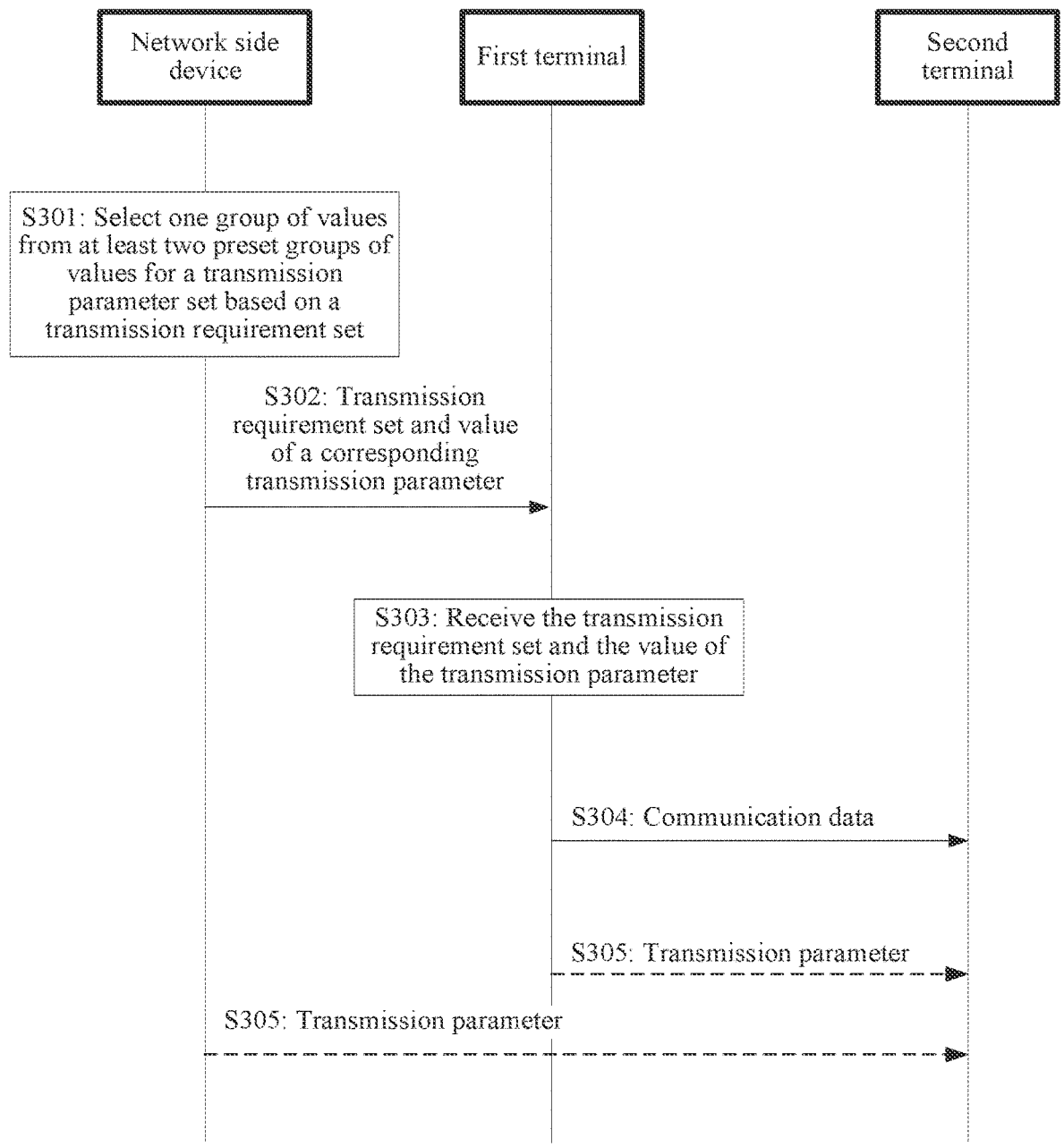
FIG. 10 is still another flowchart of a communication method according to an embodiment of the present invention.

FIG. 10 is still another schematic flowchart of a communication method according to an embodiment of the present invention. As shown in FIG. 10, the method includes the following operations.

Operation S301: The network side device selects one group of values from at least two preset groups of values for a transmission parameter set based on a transmission requirement set.

The transmission requirement set may include one or more of the following: a data packet length, a transmission delay, a transmission rate, a packet loss rate, a priority, and a QCI, and the transmission requirement includes, but is not limited to, the transmission requirements listed above.

Different values of each of the foregoing transmission requirements form different levels of the transmission requirement. For example, for the data packet length, it may be understood that, a data packet whose value of a data packet length is greater than or equal to 300 bytes and a data packet whose value of a data packet length is less than or equal to 300 bytes form two levels of the data packet lengths. At least one transmission requirement in the transmission requirement set has at least two levels, and different transmission requirement levels correspond to different groups of values. For example, if the transmission requirement set includes one transmission requirement: the data packet length, the data packet length forms the transmission requirement set. The data packet length has at least two levels, and each level of the data packet length corresponds to one group of values of the parameter set. If the parameter set includes two transmission requirements: the data packet length and the transmission delay, the data packet length and the transmission delay form the transmission requirement set. Levels of the data packet length and the transmission delay may be as follows: The data packet length has at least two levels, and the transmission delay has one level; or the data packet length has one level, and the transmission delay has at least two levels; or both the data packet length and the transmission delay have at least two levels. Various combinations of the level of the data packet length and the level of the transmission delay respectively correspond to different groups of values of the transmission parameter set. For example, if the data packet length has two levels that are respectively a large data packet and a small data packet, and the transmission delay has two levels that are respectively a service requiring a low delay and a service requiring a high delay, the large data packet and the service requiring a low delay correspond to one group of values of the transmission parameter set; the large data packet and the service requiring a high delay correspond to one group of values of the transmission parameter set; the small data packet and the service requiring a low delay correspond to one group of values of the transmission parameter set; and the small data packet and the service requiring a low delay correspond to one group of values of the transmission parameter set. A case in which the transmission requirement set includes more than two transmission requirements is similar to this, and details are not described herein again.

In this embodiment of the present invention, each of the foregoing transmission requirements is described below.

1. The Transmission Requirement Set Includes the Data Packet Length.

In this embodiment of the present invention, the network side device may classify data packets into at least two types of data packets based on data packet lengths, and select a transmission parameter from the transmission parameter set for each type of data packet. The transmission parameter set may be the transmission parameter set described in the foregoing embodiment, for example, the transmission parameter set used in S101.

For example, in this embodiment of the present invention, the network side device may classify data packets into two types of data packets. A data packet whose data packet length is greater than or equal to 300 bytes is referred to as a large data packet, and a data packet whose data packet length is less than 300 bytes is referred to as a small data packet. When a specific value is selected for the transmission parameter, the following manner may be used:

The network side device selects the transmission parameter, that is, transmit power, for the large data packet and the small data packet, and selects one of at least two values that are preset for the transmit power, for example, selects the value P1 from P1 and P2 for the large data packet, and selects the value P2 from P1 and P2 for the small data packet.

Alternatively, the network side device selects the transmission parameter, that is, transmit power, for the large data packet, and selects the transmission parameter, that is, a transmit power offset, for the small data packet, for example, selects the value P1 from P1 and P2 for the large data packet, and selects ΔP1 from ΔP1 and ΔP2 for the small data packet.

Alternatively, the network side device selects the transmission parameter, that is, a transmit power offset, for the large data packet, and selects the transmission parameter, that is, transmit power, for the small data packet, for example, selects ΔP2 from ΔP1 and ΔP2 for the large data packet, and selects the value P2 from P1 and P2 for the small data packet.

Alternatively, the network side device selects the transmission parameter, that is, a sending probability weight, for the large data packet and the small data packet, for example, selects X1=1 from X1=1 and X2=0.5 for the large data packet, and selects X2=0.5 from X1=1 and X2=0.5 for the small data packet, that is, the small data packet is sent at a probability of 0.5.

Alternatively, the network side device selects the transmission parameter, that is, a sending period, for the large data packet and the small data packet, for example, selects a sending period for the large data packet, for example, selects T1=100 ms from T1=100 ms and T2=200 ms, that is, the large data packet is sent at an interval of 100 ms; and selects another sending period for the small data packet, for example, selects T2=200 ms from T1=100 ms and T2=200 ms, that is, the small data packet is sent at an interval of 200 ms.

Alternatively, the network side device selects the transmission parameter, that is, a quantity of retransmissions, for the large data packet and the small data packet, selects a quantity of retransmissions for the large data packet, for example, selects N1=3 from N1=3, N2=1, and N3=0, that is, each data packet in the large data packet is sent four times (the data packet is to be transmitted once, and is to be retransmitted three times, that is, the data packet is to be transmitted four times in total), and selects another quantity of retransmissions for the small data packet, for example, selects N3=0 from N1=3, N2=1, and N3=0, that is, each data packet in the small data packet is to be sent once and is not to be retransmitted.

Alternatively, the network side device selects the transmission parameter, that is, an MCS level, for the large data packet and the small data packet, selects an MCS level for the large data packet, for example, selects MCS=6 from 32 preset MCS levels that are respectively MCS=0 to MCS=31, that is, the large data packet is sent at the MCS level 6, and selects another MCS level for the small data packet, for example, MCS=10, that is, the small data packet is sent at the MCS level 10.

Alternatively, the network side device selects the transmission parameter, that is, a resource pool configuration parameter, for the large data packet and the small data packet, selects a resource pool configuration parameter for the large data packet, for example, selects C1 from C1 and C2, and selects another resource pool configuration parameter for the small data packet, for example, selects C2 from C1 and C2.

Alternatively, if transmission parameters selected by the network side device for the large data packet and the small data packet are at least two of the foregoing transmission parameters, one group of values that is corresponding to the at least two transmission parameters may be selected for the large data packet. For example, if the network side device selects the transmission parameters: the transmit power and the resource pool configuration parameter for the large data packet and the small data packet, one group of values of the transmit power and the resource pool configuration parameter may be selected for the large data packet, for example, one group of values of the transmit power P1 and the resource pool configuration parameter C1 is selected, and another group of values of the transmit power and the resource pool configuration parameter may be selected for the small data packet, for example, one group of values of the transmit power P2 and the resource pool configuration parameter C2 is selected.

2. The Transmission Requirement Set Includes the Transmission Delay.

In this embodiment of the present invention, the network side device may define at least two delay requirements, and select, specific to each delay requirement, a transmission parameter from the transmission parameter set. The transmission parameter set may be the transmission parameter set in the foregoing embodiment, for example, the transmission parameter set used in S101.

In this embodiment of the present invention, the network side device may classify delay requirements into two types, for example, a service whose delay is required to be less than or equal to 100 ms is used as a service requiring a low delay, and a service whose delay is required to be less than or equal to 500 ms is used as a service requiring a high delay. The network side device may select a same transmission parameter for the service requiring a low delay and the service requiring a high delay, where the transmission parameter corresponds to different values. Alternatively, the network side device may select different transmission parameters for the service requiring a low delay and the service requiring a high delay. For a specific selection method, refer to a process for selecting a transmission parameter and a value of the transmission parameter for the large data packet and the small data packet in the foregoing embodiment, and details are not described herein again.

3. The Transmission Requirement Set Includes a Transmission Rate Requirement.

In this embodiment of the present invention, the network side device may define at least two transmission rate requirements, and select a transmission parameter from the transmission parameter set for each transmission rate requirement. The transmission parameter set may be the transmission parameter set in the foregoing embodiment, for example, the transmission parameter set used in operation S101.

In this embodiment of the present invention, the network side device may classify transmission rate requirements into two types, for example, a service requiring ten transmissions per second is used as a service requiring a high transmission rate, and a service requiring two transmissions per second is used as a service requiring a low transmission rate. The network side device may select a same transmission parameter for the service requiring a high transmission rate and the service requiring a low transmission rate, where the transmission parameter corresponds to different values. Alternatively, the network side device may select different transmission parameters for the service requiring a high transmission rate and the service requiring a low transmission rate. For a specific selection method, refer to a process for selecting a transmission parameter and selecting a value of the transmission parameter for the large data packet and the small data packet in the foregoing embodiment, and details are not described herein again.

4. The Transmission Requirement Set Includes a Packet Loss Rate Requirement.

In this embodiment of the present invention, the network side device may define at least two packet loss rate requirements, and select a transmission parameter from the transmission parameter set for each packet loss rate requirement. The transmission parameter set may be the transmission parameter set in the foregoing embodiment, for example, the transmission parameter set used in operation S101.

In this embodiment of the present invention, the network side device may classify packet loss rate requirements into two types, for example, a service whose packet loss rate is less than or equal to 1% is used as a service with a high requirement on a packet loss rate, and a service whose packet loss rate is less than or equal to 10% is used as a service with a low requirement on a packet loss rate. The network side device may select a same transmission parameter for the service with a high requirement on a packet loss rate and the service with a low requirement on a packet loss rate, where the transmission parameter corresponds to different values. Alternatively, the network side device may select different transmission parameters for the service with a high requirement on a packet loss rate and the service with a low requirement on a packet loss rate. For a specific selection method, refer to a process for selecting a transmission parameter and a value of the transmission parameter for the large data packet and the small data packet in the foregoing embodiment, and details are not described herein again.

5. The Transmission Requirement Set Includes a Priority Requirement.

In this embodiment of the present invention, the network side device may define at least two priority requirements, and select a transmission parameter from the transmission parameter set for each priority requirement. The transmission parameter set may be the transmission parameter set in the foregoing embodiment, for example, the transmission parameter set used in S101.

In this embodiment of the present invention, the network side device may classify priority requirements into eight types that are respectively a priority 1 to a priority 8, for example, a service with a priority level 8 is used as a service requiring a high priority, and a service with a priority level 1 is used as a service requiring a low priority. The network side device may select a same transmission parameter for the service requiring a high priority and the service requiring a low priority, where the transmission parameter corresponds to different values. Alternatively, the network side device may select different transmission parameters for the service requiring a high priority and the service requiring a low priority. For a specific selection method, refer to a process for selecting a transmission parameter and a value of the transmission parameter for the large data packet and the small data packet in the foregoing embodiment, and details are not described herein again.

6. The Transmission Requirement Set Includes a QCI Level Requirement.

In this embodiment of the present invention, the network side device may define at least two QCI level requirements, and select a transmission parameter from the transmission parameter set for each QCI level requirement. The transmission parameter set may be the transmission parameter set in the foregoing embodiment, for example, the transmission parameter set used in S101.

In this embodiment of the present invention, the network side device may classify QCI level requirements into eight types that are respectively a QCI level 1 to a QCI level 8, for example, a service with the QCI level 8 is used as a service requiring a high QCI level, and a service with the QCI level 1 is used as a service requiring a low QCI level. The network side device may select a same transmission parameter for the service requiring a high QCI level and the service requiring a low QCI level, where the transmission parameter corresponds to different values. Alternatively, the network side device may select different transmission parameters for the service requiring a high QCI level and the service requiring a low QCI level. For a specific selection method, refer to a process for selecting a transmission parameter and a value of the transmission parameter for the large data packet and the small data packet in the foregoing embodiment, and details are not described herein again.

In this embodiment of the present invention, the transmission requirement set may include at least two of the foregoing various transmission requirements. Specific to each transmission requirement, a process for selecting a transmission parameter and a value of the transmission parameter may be performed in the foregoing manner.

Operation S302: The network side device sends the transmission requirement set and a value of a transmission parameter corresponding to the transmission requirement set.

In this embodiment of the present invention, the network side device may broadcast a transmission requirement based on which the group of values is selected for the transmission parameter set, so that a terminal receiving the transmission requirement and the corresponding transmission parameter transmits data based on the value of the transmission parameter set corresponding to the transmission requirement set. For example, if the terminal obtains the transmission parameter, that is, the sending period, in the transmission parameter set from the network side device, and for a value of the sending period, a sending period of a large data packet whose data packet length is greater than or equal to 300 bytes is 500 ms, and a sending period of a small data packet whose data packet length is less than 300 bytes is 100 ms, the transmission requirement set sent by the network side device and received by the terminal includes the data packet length, and the terminal sends, at an interval of 500 ms, the large data packet whose data packet length is greater than or equal to 300 bytes, and sends, at an interval of 100 ms, the small data packet whose data packet length is less than 300 bytes.

Specifically, the network side device may send the transmission requirement and the corresponding transmission parameter in a broadcast mode, or send the transmission requirement and the corresponding transmission parameter by using RRC signaling, or send the transmission requirement and the corresponding transmission parameter by using control signaling. The control signaling is classified into common control signaling and user-specific control signaling.

The network side device sends the transmission requirement and the corresponding transmission parameter in a broadcast mode by using the common control signaling, so that all terminals in a cell have the same parameter for the transmission requirement. Alternatively, the network side device sends the transmission requirement and the corresponding transmission parameter by using the RRC signaling or the user-specific control signaling, so that different terminals may have different parameters specific to the transmission requirement.

For example, if the network side device selects a parameter based on the data packet length, and a network side device selects the quantity of retransmissions: N1=3 for a data packet whose data packet length is greater than or equal to 300 bytes, and sends the transmission requirement and the corresponding transmission parameter in a broadcast mode, data packets that are sent by all the terminals in the cell and whose data packet lengths are greater than or equal to 300 bytes are to be retransmitted three times. If the network side device selects a parameter based on the data packet length, and a network side device selects quantities of retransmissions: N1=3 and N2=1 for data packets whose data packet lengths are greater than or equal to 300 bytes, and sends the transmission requirement and the corresponding parameter by using dedicated control signaling, that is, sends the transmission requirement and the corresponding quantity N1 of retransmissions to a terminal 1, and sends the transmission requirement and the corresponding quantity N2 of retransmissions to a terminal 2 by using the dedicated control signaling, a data packet that is sent by the terminal 1 and whose data packet length is greater than or equal to 300 bytes is to be retransmitted three times, and a data packet that is sent by the terminal 2 and whose data packet length is greater than or equal to 300 bytes is to be retransmitted once.

Optionally, in this embodiment of the present invention, the network side device may set a classification threshold for classifying a transmission requirement level, for example, a classification threshold for classifying a large data packet and a small data packet is 300 bytes, and the classification threshold is broadcast in the cell.

Operation S303: A first terminal receives the transmission requirement set and the value of the transmission parameter set corresponding to the transmission requirement set that are sent by the network side device.

Operations S304 and S305 are respectively the same as operations S104 and S105 in FIG. 8, and details are not described herein again.

In this embodiment of the present invention, the first terminal serving as a sending terminal may obtain the group of values of the at least two groups of values of the transmission parameter set from the network side device in the foregoing embodiment, or may select the group of values from the at least two preconfigured groups of values of the transmission parameter set, and send communication data based on the selected group of values. For an implementation process, refer to FIG. 11.

Figure 11:
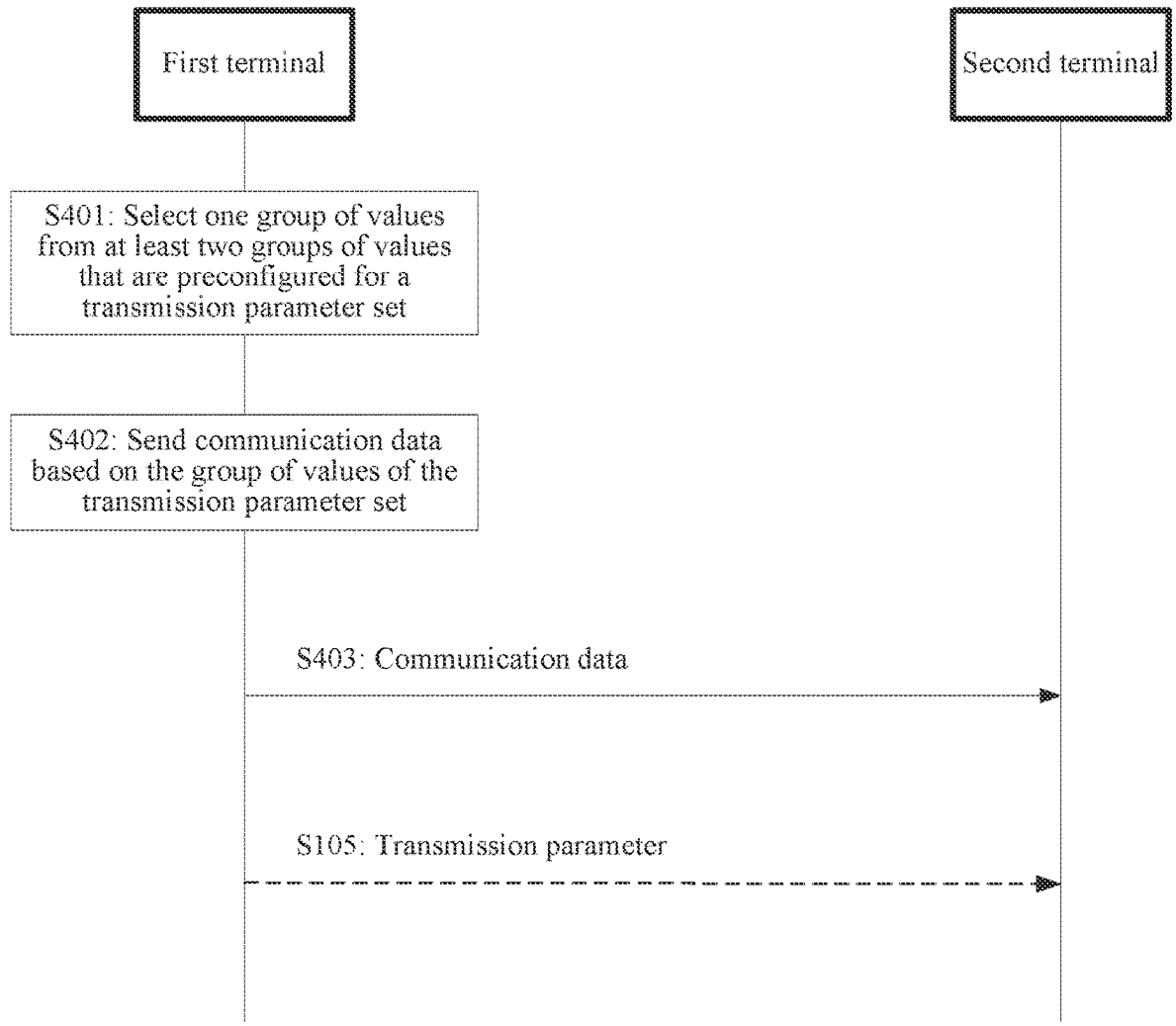
FIG. 11 is still another flowchart of a communication method according to an embodiment of the present invention.

FIG. 11 is still another schematic flowchart of a communication method according to an embodiment of the present invention. As shown in FIG. 11, the method includes the following operations.

Operation S401: A first terminal selects one group of values from at least two groups of values that are preconfigured for a transmission parameter set.

Each group of values of the at least two groups of values includes a value of each transmission parameter in the transmission parameter set. The transmission parameter set may be the transmission parameter set in the foregoing embodiment, for example, the transmission parameter set used in S101.

Optionally, the first terminal may select, based on a preconfigured transmission requirement set, the group of values from the at least two groups of values that are preset for the transmission parameter set, to implement differentiated transmission specific to different transmission requirements.

A difference between the transmission requirement set and the transmission requirement set in the foregoing embodiment lies in that the transmission requirement set is preconfigured by the terminal, and the other part is the same as the transmission requirement set in the foregoing embodiment, for example, the transmission requirement set used in operation S301.

Operation S402: The first terminal sends communication data based on the group of values of the transmission parameter set.

Operations S403 and S404 are respectively the same as Operations S104 and S105 in FIG. 8, and details are not described herein again.

Optionally, before selecting the group of values from the at least two preset groups of values for the transmission parameter set, the first terminal may measure a link status of a sidelink, and determine, based on a measurement result, whether the sidelink is in a congested state, and if the sidelink is in a congested state, select a value based on sidelink congestion information, thereby alleviating congestion. An implementation process is shown in FIG. 12.

Figure 12:
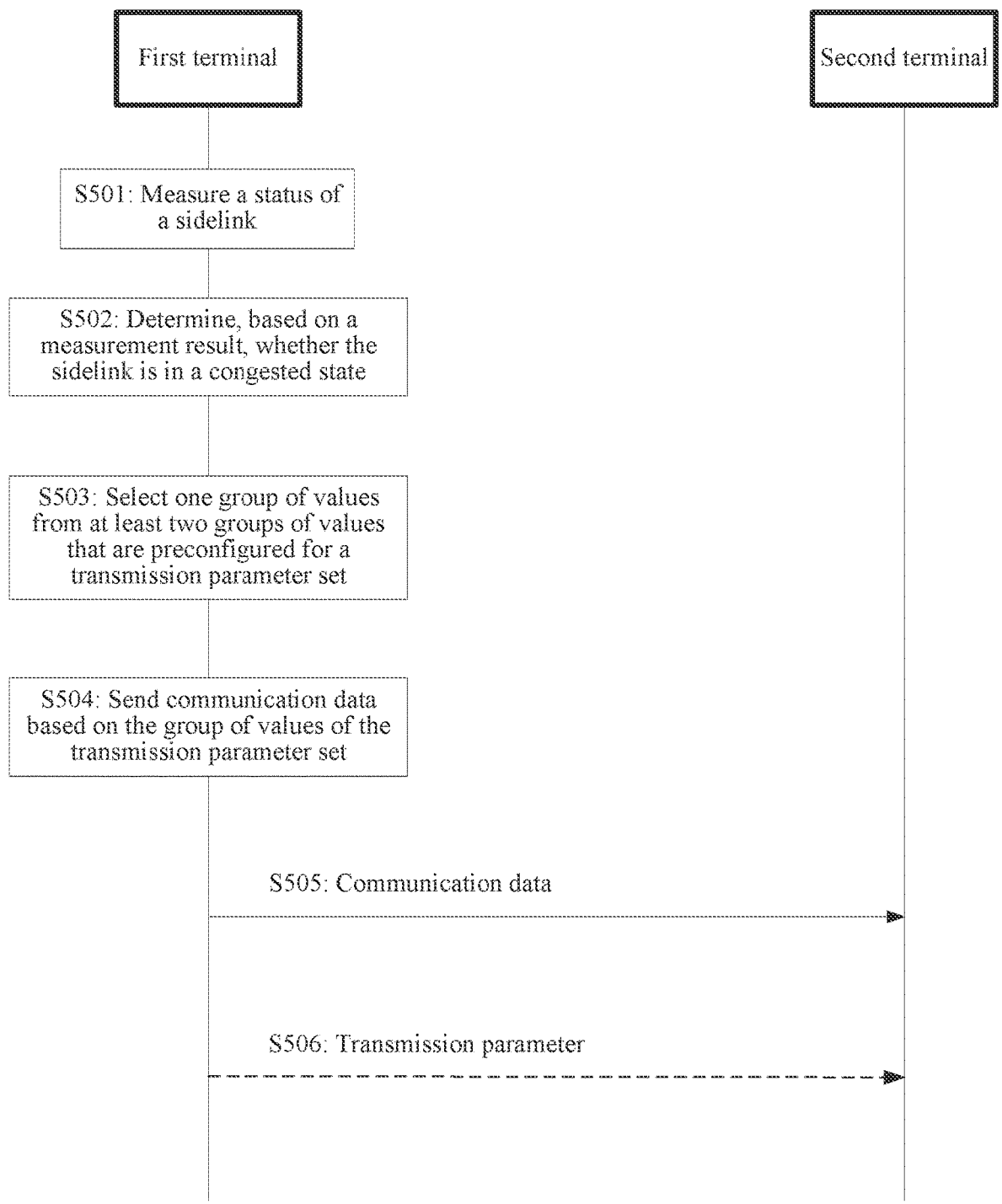
FIG. 12 is still another flowchart of a communication method according to an embodiment of the present invention.

In a method procedure shown in FIG. 12, operations S503, S504, S505, and S506 are respectively the same as or similar to operations S401, S402, S403, and S404 in FIG. 11, and a difference from FIG. 11 lies in that, before the selecting one group of values from at least two preconfigured groups of values for a transmission parameter set, the method further includes the following operation.

Operation S501: The first terminal measures a status of a sidelink.

The status of the sidelink that is measured by the first terminal may be, for example, an interference level, an energy level, an RSRP value, or resource usage.

or similar to S502: Determine, based on a measurement result, whether the sidelink is in a congested state.

The determining, based on a measurement result, whether the sidelink is congested may be determining whether a specified parameter exceeds a specified threshold. For example, the first terminal determines whether the resource usage of the sidelink exceeds a threshold, for example, whether the resource usage exceeds 50% or 80%; and if the threshold is exceeded, it is considered that the sidelink is in a congested state; otherwise, the sidelink is not congested.

Differentiated data transmission provided in the embodiments of the present invention may be applied to a scenario in which the foregoing two application scenarios are combined, that is, when network congestion occurs, the value of the transmission parameter set may be selected based on the transmission requirement set. For a specific implementation process, refer to the descriptions of the foregoing embodiment, and details are not described herein again.

It should be noted that, in the embodiments of the present invention, "plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

A person of ordinary skill in the art may understand that all or some of the steps in each of the foregoing method of the embodiments may be implemented by a program instructing a processor. The foregoing program may be stored in a computer readable storage medium. The storage medium may be a non-transitory medium, such as a random-access memory, a read-only memory, a flash memory, a hard disk, a solid state drive, a magnetic tape, a floppy disk, an optical disc, or any combination thereof.

The present invention is described with reference to flowcharts and block diagrams of the method and the device in the embodiments of the present invention. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
   determining, by a network side apparatus, according to sidelink congestion information, a modulation and coding scheme (MCS) level and a quantity of retransmissions, wherein the MCS level and the quantity of retransmissions are comprised in a transmission parameter set; and
   sending, by the network side apparatus to a first terminal apparatus, a control signaling indicates the MCS level and the quantity of retransmissions.

2. The method according to claim 1, wherein the method further comprises:
   obtaining, by the network side apparatus, the sidelink congestion information from the first terminal apparatus.

3. The method according to claim 1, wherein the method further comprises:
   sending, by the network side apparatus, a priority to the first terminal apparatus.

4. The method according to claim 3, wherein the method further comprises:

determining, by the network side apparatus, according to the sidelink congestion information and the priority, a group of values for the transmission parameter set, wherein the priority has at least two levels, and each level of the priority corresponds to a respective group of values of the transmission parameter set.

5. The method according to claim 3, wherein:
the group of values is from at least two groups of values, each group of values of the at least two groups of values comprises a value of each transmission parameter in the transmission parameter set, and at least one transmission parameter in the transmission parameter set has at least two values.

6. The method according to claim 1, wherein:
the transmission parameter set further comprises a transmit power.

7. A network side apparatus comprising:
at least one processor, when executing instructions, causing the network side apparatus to:
determine, according to sidelink congestion information, a modulation and coding scheme (MCS) level and a quantity of retransmissions, wherein the MCS level and the quantity of retransmissions are comprised in a transmission parameter set; and
send a control signaling indicates the MCS level and the quantity of retransmissions to a first terminal apparatus.

8. The network side apparatus according to claim 7, wherein the instructions comprise one or more instructions that cause the network side apparatus to:
obtain the sidelink congestion information from the first terminal apparatus.

9. The network side apparatus according to claim 7, wherein the instructions comprise one or more instructions that cause the network side apparatus to:
send a priority to the first terminal apparatus.

10. The network side apparatus according to claim 9, wherein the instructions comprise one or more instructions that cause the network side apparatus to:
determine, according to the sidelink congestion information and the priority, a group of values for the transmission parameter set, wherein the priority has at least two levels, and each level of the priority corresponds to a respective group of values of the transmission parameter set.

11. The network side apparatus according to claim 9, wherein:
the group of values is from at least two groups of values, each group of values of the at least two groups of values comprises a value of each transmission parameter in the transmission parameter set, and at least one transmission parameter in the transmission parameter set has at least two values.

12. The network side apparatus according to claim 7, wherein:
the transmission parameter set further comprises a transmit power.

13. A non-transitory computer-readable media storing computer instructions that, when executed by one or more processors, cause the one or more processors to perform operations comprising:
determining, according to sidelink congestion information, a modulation and coding scheme (MCS) level and a quantity of retransmissions, wherein the MCS level and the quantity of retransmissions are comprised in a transmission parameter set; and
sending, to a first terminal apparatus, a control signaling indicates the MCS level and the quantity of retransmissions.

14. The non-transitory computer-readable media according to claim 13, wherein the operations further comprise:
obtaining the sidelink congestion information from the first terminal apparatus.

15. The non-transitory computer-readable media according to claim 13, wherein the operations further comprise:
sending a priority to the first terminal apparatus.

16. The non-transitory computer-readable media according to claim 15, wherein:
determining, according to the sidelink congestion information and the priority, a group of values for the transmission parameter set, wherein the priority has at least two levels, and each level of the priority corresponds to a respective group of values of the transmission parameter set.

17. The non-transitory computer-readable media according to claim 13, wherein:
the group of values is from at least two groups of values, each group of values of the at least two groups of values comprises a value of each transmission parameter in the transmission parameter set, and at least one transmission parameter in the transmission parameter set has at least two values.

18. The non-transitory computer-readable media according to claim 13, wherein:
the transmission parameter set further comprises a transmit power.

19. A communication method, comprising:
receiving, by a first terminal apparatus from a network side apparatus, a control signaling indicates a modulation and coding scheme (MCS) level and a quantity of retransmissions, wherein the MCS level and the quantity of retransmissions are comprised in a transmission parameter set, the MCS level and the quantity of retransmissions is determined according to sidelink congestion information; and
sending, by the first terminal apparatus, sidelink communication data based on the MCS level and the quantity of retransmissions to a second terminal apparatus.

20. The method according to claim 19, wherein the method further comprises:
sending, by the first terminal apparatus, the sidelink congestion information to the network side apparatus.

21. The method according to claim 19, wherein the method further comprises:
receiving, by the first terminal apparatus, a priority from the network side apparatus.

22. The method according to claim 21, wherein the method further comprises:
a group of values for the transmission parameter set is determined according to the sidelink congestion information and the priority, wherein the priority has at least two levels, and each level of the priority corresponds to a respective group of values of the transmission parameter set.

23. The method according to claim 21, wherein:
the group of values is from at least two groups of values, each group of values of the at least two groups of values comprises a value of each transmission parameter in the transmission parameter set, and at least one transmission parameter in the transmission parameter set has at least two values.

24. The method according to claim 19, wherein:
the transmission parameter set further comprises a transmit power.

25. A first terminal apparatus comprising:
at least one processor, when executing instructions, causing the first terminal apparatus to:
receive, from a network side apparatus, a control signaling indicates a modulation and coding scheme (MCS) level and a quantity of retransmissions, wherein the MCS level and the quantity of retransmissions are comprised in a transmission parameter set, the MCS level and the quantity of retransmissions is determined according to sidelink congestion information; and
send, sidelink communication data based on the MCS level and the quantity of retransmissions to a second terminal apparatus.

26. The first terminal apparatus according to claim 25, wherein the instructions comprise one or more instructions that cause the first terminal apparatus to:
send, the sidelink congestion information to the network side apparatus.

27. The first terminal apparatus according to claim 25, wherein the instructions comprise one or more instructions that cause the first terminal apparatus to:
receive, a priority from the network side apparatus.

28. The first terminal apparatus according to claim 27, wherein:
a group of values for the transmission parameter set is determined according to the sidelink congestion information and the priority, wherein the priority has at least two levels, and each level of the priority corresponds to a respective group of values of the transmission parameter set.

29. The first terminal apparatus according to claim 27, wherein:
the group of values is from at least two groups of values, each group of values of the at least two groups of values comprises a value of each transmission parameter in the transmission parameter set, and at least one transmission parameter in the transmission parameter set has at least two values.

30. The first terminal apparatus according to claim 25, wherein:
the transmission parameter set further comprises a transmit power.

31. A non-transitory computer-readable media storing computer instructions that, when executed by one or more processors, cause the one or more processors to perform operations comprising:
receiving, from a network side apparatus, a control signaling indicates a modulation and coding scheme (MCS) level and a quantity of retransmissions, wherein the MCS level and the quantity of retransmissions are comprised in a transmission parameter set, the MCS level and the quantity of retransmissions is determined according to sidelink congestion information; and
sending, sidelink communication data based on the MCS level and the quantity of retransmissions to a second terminal apparatus.

32. The non-transitory computer-readable media according to claim 31, wherein the operations further comprise:
sending the sidelink congestion information to the network side apparatus.

33. The non-transitory computer-readable media according to claim 31, wherein the operations further comprise:
receiving a priority from the network side apparatus.

34. The non-transitory computer-readable media according to claim 33, wherein:
a group of values for the transmission parameter set is determined according to the sidelink congestion information and the priority, wherein the priority has at least two levels, and each level of the priority corresponds to a respective group of values of the transmission parameter set.

35. The non-transitory computer-readable media according to claim 31, wherein:
the group of values is from at least two groups of values, each group of values of the at least two groups of values comprises a value of each transmission parameter in the transmission parameter set, and at least one transmission parameter in the transmission parameter set has at least two values.

* * * * *

UNITED STATES PATENT AND TRADEMARK OFFICE
CERTIFICATE OF CORRECTION

| | |
|---|---|
| PATENT NO. | : 12,156,235 B2 |
| APPLICATION NO. | : 18/469190 |
| DATED | : November 26, 2024 |
| INVENTOR(S) | : Deping Liu and Zhenshan Zhao |

Page 1 of 1

It is certified that error appears in the above-identified patent and that said Letters Patent is hereby corrected as shown below:

On the Title Page

In Column 1 (item (30) Foreign Application Priority Data), In Line 1, Delete "(WO)" and insert -- (CN) --.

Signed and Sealed this
Fourth Day of March, 2025

Coke Morgan Stewart
*Acting Director of the United States Patent and Trademark Office*